(12) United States Patent
Yucelen et al.

(10) Patent No.: US 12,488,679 B2
(45) Date of Patent: Dec. 2, 2025

(54) EVENT TRIGGERED INFORMATION EXCHANGE FOR DISTRIBUTED CONTROL OF NETWORKED MULTIAGENT SYSTEMS

(71) Applicant: UNIVERSITY OF SOUTH FLORIDA, Tampa, FL (US)

(72) Inventors: Tansel Yucelen, Tampa, FL (US); Stefan Ristevski, Tampa, FL (US); Jonathan Muse, Beavercreek, OH (US)

(73) Assignees: UNIVERSITY OF SOUTH FLORIDA, Tampla, FL (US); GOVERNMENT OF THE UNITED STATES AS REPRESENTED BY THE SECRETARY OF THE AIR FORCE, Wright Patterson Afb, OH (US)

( * ) Notice: Subject to any disclaimer, the term of this patent is extended or adjusted under 35 U.S.C. 154(b) by 297 days.

(21) Appl. No.: 18/344,673

(22) Filed: Jun. 29, 2023

(65) Prior Publication Data
US 2024/0127693 A1  Apr. 18, 2024

Related U.S. Application Data

(60) Provisional application No. 63/356,870, filed on Jun. 29, 2022.

(51) Int. Cl.
*G08G 1/01* (2006.01)
*H04L 67/12* (2022.01)

(52) U.S. Cl.
CPC ............ *G08G 1/0112* (2013.01); *H04L 67/12* (2013.01)

(58) Field of Classification Search
CPC .............................. G08G 1/0112; H04L 67/12
USPC ......................................................... 370/328
See application file for complete search history.

(56) References Cited

PUBLICATIONS

Dimarogonas et al., Distributed Event-Triggered Control for Multi-Agent Systems, IEEE Transactions on Automatic Control, vol. 57, No. 5, pp. 1291-1297, May 2012 (Year: 2012).*
Zou et al., Event-triggered distributed predictive control for asynchronous coordination of multi-agent systems, Automatica, vol. 99, pp. 92-98, Jan. 2019 (Year: 2019).*
"Bitcraze home website," https://www.bitcraze.io/, accessed: Apr. 27, 2020, pp. 1-15.

(Continued)

*Primary Examiner* — Nicholas R Taylor
*Assistant Examiner* — Chong G Kim
(74) *Attorney, Agent, or Firm* — HUSCH BLACKWELL LLP

(57) ABSTRACT

Methods and systems for information exchange of a vehicle in a networked multiagent system are disclosed. The methods and systems include: receiving a last neighbor dataset broadcasted by a neighbor vehicle; determining a current dataset based on the last neighbor dataset and a last vehicle dataset of the first vehicle; identifying a violation of an event-triggering condition by comparing a difference between the last vehicle dataset and the current dataset with a dynamic threshold; determining a transmission dataset being associated with the current dataset; and in response to the violation, broadcasting the transmission dataset to the neighbor vehicle. The dynamic threshold is defined by an exponentially decaying term and an error between a vehicle state of the first vehicle and a reference state. Other aspects, embodiments, and features are also claimed and described.

20 Claims, 18 Drawing Sheets

(56) References Cited

PUBLICATIONS

Anta, A., et al., "Self-triggered stabilization of homogeneous control systems," in American Control Conference. IEEE, 2008, pp. 4129-4134.

Bullo, F., et al. Distributed control of robotic networks; A mathematical approach to motion coordination algorithms. Princeton University Press, 2009, vol. 27. pp. 1-323.

Chen, X., et al. "Asynchronous decentralised event-triggered control of multi-agent systems," International Journal of Control, vol. 87, No. 10, pp. 2130-2139, 2014.

Garcia, E. et al. "Decentralised event-triggered cooperative control with limited communication," International Journal of Control, vol. 86, nu. 9, pp. 1479-1488, 2013.

Godsil, C., et al. Algebraic graph theory. Springer Science & Business Media, 2013, vol. 207. pp. 1-19.

Guo, G., et al. "A distributed event-triggered trans-mission strategy for sampled-data consensus of multi-agent systems," Automatica, vol. 50, nu. 5, pp. 1489-1496, 2014.

Heemels, W. H., et al. "Periodic event-triggered control for linear systems," IEEE Transactions on Automatic Control, vol. 58, nu. 4, pp. 847-861, 2012.

Heemels, W., et al. An introduction to event-triggered and self-triggered control; in 2012 IEEE 51st IEEE Conference on Decision and Control (CDC). IEEE, 2012, pp. 3270-3285.

Lewis, F. L., et al., Cooperative control of multi-agent systems; Optimal and adaptive design approaches. Springer Science & Business Media, 2013. pp. 1-315.

Liu, Q., et al., "A survey of event-based strategies on control and estimation," Systems Science & Control Engineering: An Open Access Journal, vol. 2, No. 1, pp. 90-97, 2014.

Mazo, M., et al., "Decentralized event-triggered control over wireless sensor/actuator networks," IEEE Transactions on Automatic Control, vol. 56, No. 10, pp. 2456-2461, 2011.

Mazo, M., et al., "On event-triggered and self-triggered control over sensor/actuator networks," in Conference on Decision and Control. IEEE, 2008, pp. 435-440.

Mesbahi, M., et al., Graph theoretic methods in multiagent networks. Princeton University Press, 2010, vol. 33. pp. 1-423. (book).

Ristevski, S., et al. "A new event-triggering approach for scheduling guidance data transmissions in networked control systems," in 2020 American Control Conference (ACC). IEEE, 2020, pp. 4411-4416.

Shamma, J. Cooperative control of distributed multi-agent systems. John Wiley & Sons, 2008. pp. 1-454. (book).

Shoukry, Y., et al., "Event-triggered state observers for sparse sensor noise/attacks," IEEE Transactions on Automatic Control, vol. 61, No. 8, pp. 2079-2091, 2015.

Wang, A., et al. "Consensus control for a multi-agent system with integral-type event-triggering condition and asynchronous periodic detection," IEEE Transactions on industrial Electronics, vol. 64, No. 7, pp. 5629-5639, 2017.

Yang, D., et al. "Decentralized event-triggered consensus for linear multi-agent systems under general directed graphs," Automatica, vol. 69, pp. 242-249, 2016.

M, X., et al. "Dynamic event-triggered and self-triggered control for multi-agent systems," IEEE Transactions on Automatic Control, vol. 64, nu. 8, pp. 3300-3307, 2018.

Yucelen, T. et al. "Active-passive networked multiagent systems," in 53rd IEEE Conference on Decision and Control. IEEE, 2014, pp. 6939-6944.

Zhou, B., et al. "Leader-following exponen tial consensus of general linear multi-agent systems via event-triggered control with combinational measurements," Applied Mathematics Letters, vol. 40, pp. 35-39, 2015.

Zhou, X., et al. Event based guaranteed cost consensus for distributed multi-agent systems; Journal of the Franklin Institute, vol. 352, No. 9, pp. 3546-3563, 2015.

Zou, Y., et al. "Event-triggered distributed predictive control for asynchronous coordination of multi-agent systems," Automatica, vol. 99, pp. 92-98, 2019.

* cited by examiner

EVENT TRIGGERED INFORMATION EXCHANGE FOR DISTRIBUTED CONTROL OF NETWORKED MULTIAGENT SYSTEMS

CROSS-REFERENCE TO RELATED APPLICATION(S)

This application claims the benefit of U.S. Provisional Patent Application Ser. No. 63/356,870, filed Jun. 29, 2022, the disclosure of which is hereby incorporated by reference in its entirety, including all figures, tables, and drawings

STATEMENT REGARDING FEDERALLY SPONSORED RESEARCH

This invention was made with government support under the Universal Technology Corporation Grant 162642-20-25-C1 awarded by the Air Force Research Laboratory Aerospace Systems Directorate. The government has certain rights in the invention.

SUMMARY

The following presents a simplified summary of one or more aspects of the present disclosure, to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects of the present disclosure, methods, systems, and apparatus for information exchange of a vehicle in in a multiagent system are disclosed. These methods, systems, and apparatus can include steps or components for managing and/or directing information exchange among members of a group of agents (e.g., devices, drones, vehicles, etc.) operating in a concerted fashion, in a more efficient and event-driven manner.

For example, in one aspect, a method is provided for information exchange of a first vehicle in a networked multiagent system, comprising: receiving a last neighbor dataset broadcasted by a neighbor vehicle; determining a current dataset based on the last neighbor dataset and a last vehicle dataset of the first vehicle; identifying a violation of an event-triggering condition by comparing a difference between the last vehicle dataset and the current dataset with a dynamic threshold, the dynamic threshold being defined by an exponentially decaying term and an error between a vehicle state of the first vehicle and a reference state; determining a transmission dataset being associated with the current dataset; in response to the violation, broadcasting the transmission dataset to the neighbor vehicle. In some embodiments, such a method may be used to govern communication among multiple agents during a given operation, such as driving, flying, searching for objects, deliveries, etc. in a more efficient manner.

In another aspect, an apparatus is provided, for providing information exchange among vehicles, the apparatus comprising: a processor; and a memory having stored thereon a set of instructions which, when executed by the processor, cause the processor to: receive a last neighbor dataset broadcasted by a neighbor vehicle; determine a current dataset based on the last neighbor dataset and a last vehicle dataset of the first vehicle; identify a violation of an event-triggering condition by comparing a difference between the last vehicle dataset and the current dataset with a dynamic threshold, the dynamic threshold being defined by an exponentially decaying term and an error between a vehicle state of the first vehicle and a reference state; determine a transmission dataset being associated with the current dataset; in response to the violation, broadcast the transmission dataset to the neighbor vehicle.

These and other aspects of the disclosure will become more fully understood upon a review of the drawings and the detailed description, which follows. Other aspects, features, and embodiments of the present disclosure will become apparent to those skilled in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. Similarly, while example embodiments may be discussed below as devices, systems, or methods embodiments it should be understood that such example embodiments can be implemented in various devices, systems, and methods.

DETAILED DESCRIPTION

Figure 1:
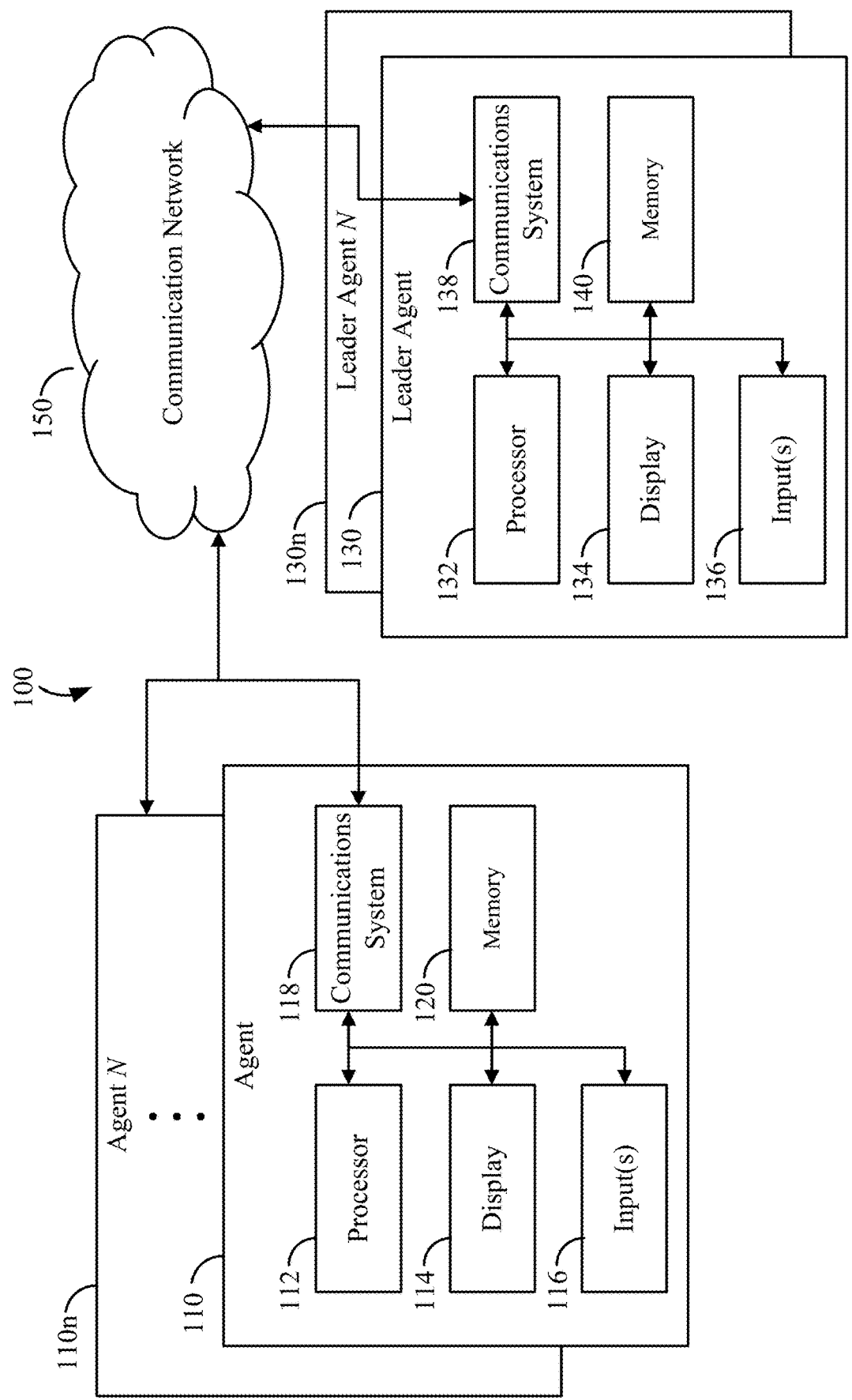
FIG. 1 is a block diagram conceptually illustrating a multiagent system for information exchange according to some embodiments.

The detailed description set forth below in connection with the appended drawings is intended as a description of various configurations and is not intended to represent the only configurations in which the subject matter described herein may be practiced. The detailed description includes specific details to provide a thorough understanding of various embodiments of the present disclosure. However, it will be apparent to those skilled in the art that the various features, concepts and embodiments described herein may be implemented and practiced without these specific details. In some instances, well-known structures and components are shown in block diagram form to avoid obscuring such concepts.

Technological advances in the recent decades have enabled low-cost and small-in-size integrated systems with mobility, computing, communication, and sensing capabilities. Simultaneously, theoretical advances in these decades have established a strong foundation on how these integrated systems can work together through a network (hereinafter referred to as networked multiagent systems) to support a wide array of scientific, civilian, and military applications. Applications of networked multiagent systems include, for example, surveillance, reconnaissance, ground and air traffic management, payload and passenger transportation, customized task assignment, rapid internet delivery, and emergency response. One feature of networked multiagent systems is that they utilize inter-agent (i.e., local) information exchange to accomplish a given application with guaranteed closed-loop system stability. Yet, in the design and implementation of networked multiagent systems, it is desirable not only to guarantee closed-loop system stability but also to schedule inter-agent information exchange to prevent potential network overload and decrease wireless communication costs.

For stably scheduling information exchange in networked multiagent systems, in the example methods and systems disclosed herein, a new event-triggered distributed control architecture is disclosed. The new event-triggered distributed control architecture is predicated on a dynamic threshold, which involves an error signal between the state of an agent and the state of its reference model as well as an exponentially decaying term, to schedule inter-agent information exchange. Initial and final values of the exponentially decaying term have the benefit to suppress network utilization at the beginning (when errors between the last shared and current data are high) and toward then end when the final value is chosen not to be zero.

Additionally, the example methods and systems disclosed herein incldues a method entitled solution-predictor curve. In particular, this method approximates the solution trajectory related to information exchange, where every agent stores this curve and distributively exchanges its parameters when an event occurs. Its feature is that each agent utilizes the resulting solution trajectory over the time interval until the next event occurs, where it has the capability to further reduce inter-agent information exchange as compared with the sampled data case.

Further, a system-theoretical stability analysis of the proposed event-triggered distributed control architecture is given, which captures both sampled data and solution-predictor curve cases. In some examples, when the final value of the exponentially decaying term is chosen not to be zero, show boundedness of the closed-loop system trajectories is shown. When its final value is chosen to be zero, asymptotic stability of the closed-loop system trajectories is shown. In addition, practical guidelines are disclosed on the tuning of parameters through illustrative numerical examples. In addition, the efficacy of the theoretical results are demonstrated in laboratory-level experiments. Both numerical examples and experiments show that solution-predictor curve drastically decreases the number of events and hence the network utilization compared to what can be achieved by exchanging sampled data.

FIG. 1 is a block diagram conceptually illustrating a multiagent system for information exchange. For example, the multiagent system 100 can include one or more agents (i.e., follower agents) 110, 110n and one or more leader agents 130, 130n. In some examples, the one or more agents 110, 110n and the one or more leader agents 130, 130n can be connected via a communication network 150 with a connected and undirected graph.

In some examples, the agent 110, 110n can transmit or receive information (e.g., a current dataset of the agent 110, 110n) over a communication network 150. In some examples, the communication network 150 can be any suitable communication network or combination of communication networks. For example, the communication network 150 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard, such as CDMA, GSM, LTE, LTE Advanced, NR, etc.), a wired network, etc. In some embodiments, communication network 150 can be a local area network, a wide area network, a public network (e.g., the Internet), a private or semi-private network (e.g., a corporate or university intranet), any other suitable type of network, or any suitable combination of networks. Communications links between agents 110, 110n, between agents 110, 110n and leader agents 130, 130n, and/or between leader agents 130, 130n can each be any suitable communications link or combination of communications links, such as wired links, fiber optic links, Wi-Fi links, Bluetooth links, cellular links, etc.

In further examples, the agent 110, 110n and/or a leader agent 130, 130n can be a vehicle (e.g., a ground vehicle, an aerial vehicle, an underwater vehicle, a ship, a space vehicle, an autonomous vehicle, a motor vehicle, a space vehicle, car, a train, an unmanned aerial vehicle, a rocket, or a missile, etc.) or any other suitable apparatus or means (e.g., a computing/circuit/electrical node, a transceiver, etc.). In some examples the agents may be of a uniform type (e.g., a fleet of drones operating in a concerted fashion for searching a remote area; a group of autonomous vehicles driving in a coordinated way; etc.) or may be of multiple types. And, the agents may be performing a highly coordinated, single goal operation or may be more independently performing operations.

The agent 110, 110n can include any suitable computing device or combination of devices, such as a processor (including an ASIC, DSP, PFGA, or other processing component) desktop computer, a laptop computer, a smartphone, a tablet computer, a wearable computer, a server computer, a computing device integrated into the vehicle, a camera, a robot, a virtual machine being executed by a physical computing device, etc.

In further examples, the agent 110, 110n can include a processor 112, a display 114, one or more inputs 116, one or more communication systems 118, and/or memory 120. In some embodiments, the processor 112 can be any suitable hardware processor or combination of processors, such as a central processing unit (CPU), a graphics processing unit (GPU), an application specific integrated circuit (ASIC), a field-programmable gate array (FPGA), a digital signal processor (DSP), a microcontroller (MCU), etc. In some embodiments, the display 114 can include any suitable display devices, such as a computer monitor, a touchscreen, a television, an infotainment screen, etc. In some embodiments, the input(s) 116 can include any suitable input devices and/or sensors that can be used to receive user input, such as a keyboard, a mouse, a touchscreen, a microphone, etc.

In further examples, the communications system 118 can include any suitable hardware, firmware, and/or software for communicating information over communication network 150 and/or any other suitable communication networks. For example, the communications system 118 can include one or more transceivers, one or more communication chips and/or chip sets, etc. In a more particular example, the communications system 118 can include hardware, firmware and/or software that can be used to establish a Wi-Fi connection, a Bluetooth connection, a cellular connection, an Ethernet connection, etc. to transmit the status of the agent 110, 110n and/or receive the status of the one or more neighboring agents 110, 110n, 130, 130n.

In further examples, the memory 120 can include any suitable storage device or devices that can be used to store status of the agent 110, 110n, status of the one or more neighboring agents 110, 110n, 130, 130n, a solution predictor curve of the agent 110, 110n, one or more solution predictor curves of the one or more neighboring agents 110, 110n, 130, 130n, data, instructions, values, etc., that can be used, for example, by the processor 112 to perform information exchange tasks via communications system 118, etc. The memory 120 can include any suitable volatile memory, non-volatile memory, storage, or any suitable combination thereof. For example, memory 110 can include random access memory (RAM), read-only memory (ROM), electronically-erasable programmable read-only memory (EEPROM), one or more flash drives, one or more hard disks, one or more solid state drives, one or more optical drives, etc. In some embodiments, the memory 120 can have encoded thereon a computer program for controlling operation of computing device 110. For example, in such embodiments, the processor 112 can execute at least a portion of the computer program to perform one or more data processing tasks described herein, transmit/receive information via the communications system 118, etc. As another example, processor 112 can execute at least a portion of process 200 described below in connection with FIG. 2.

In even further examples, the multiagent system can include one or more leader agents 130, 130n. For example, a leader agent may be a lead drone or vehicle being followed by others, or may be an agent having different resources than the other agents (e.g., more durable, higher/longer power life, better communication with a remote station, etc.), or may simply be designated as the leader. A leader agent 130, 130n can include a processor 132, a display 134, input(s) 136, a communication system 138, and/or a memory 140. In some examples, the processor 132, the display 134, the input(s) 136, the communication system 138, and/or the memory 140 of the leader 130, 130n are substantially similar to those in the agent 110, 110n. In addition, the leader 130, 130n can receive a command (c(t)) which the one or more agents 110, 110n and the one or more leader agents 130, 130n are to follow. In some examples, the one or more agents 110, 110n (i.e., follower agents) may not access or know the command (c(t)). In other examples, the command (c(t)) can be available to the one or more agents 110, 110n.

Figure 2:
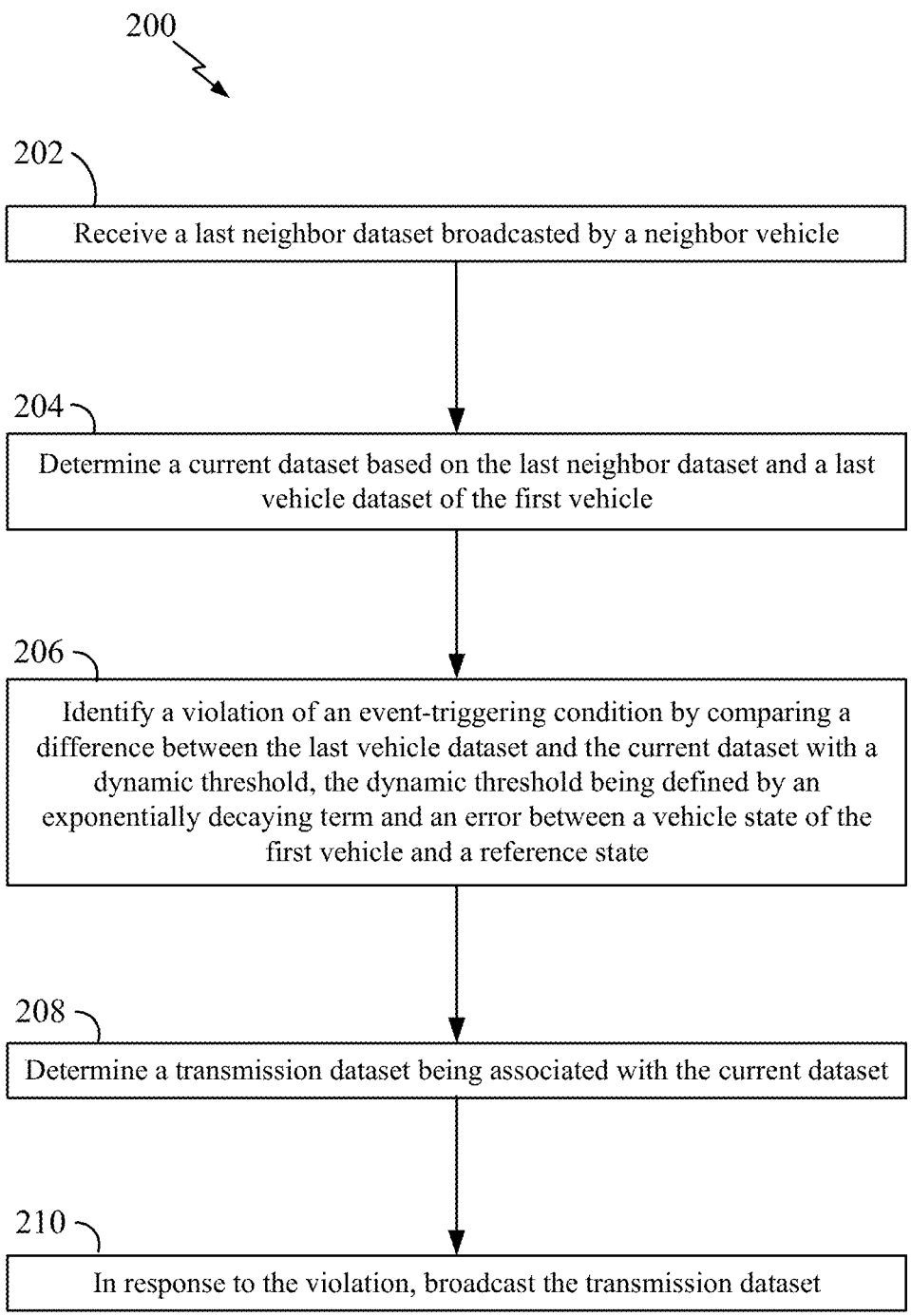
FIG. 2 is a flowchart illustrating an example process for information exchange of a vehicle in a multiagent system according to some embodiments.

FIG. 2 is a flowchart illustrating an example process for information exchange. In some examples, the process 200 for information exchange in a multiagent system may be carried out by the agent 110, 110n and/or the leader agent 130, 130n illustrated in FIG. 1. In some examples, the multiagent system can include multiple homogeneous or heterogeneous agents to communicate each other. An agent 110, 110n, 130, 130n in the multiagent system can include a vehicle (e.g., a ground vehicle, an aerial vehicle, an underwater vehicle, a ship, a space vehicle, an autonomous vehicle, a motor vehicle, a space vehicle, car, a train, an unmanned aerial vehicle, a rocket, or a missile, etc.) operating in a group or team. However, it should be appreciated that the agent 110, 110n, 130, 130n can be any other suitable apparatus or means (e.g., a computing/circuit/electrical node, a robot, a power node in a power grid) for carrying out the functions or algorithm described below. Additionally, although the steps of the flowchart 200 are presented in a sequential manner, in some examples, one or more of the steps may be performed in a different order than presented, in parallel with another step, or bypassed.

Before describing the process 200, the notation and some basic definitions from graph theory used throughout the process 200 are explained. In particular, $\mathbb{N}$ stands for the set of natural numbers, $\mathbb{Z}$ stands for the set of integers, $\mathbb{R}$ stands for the set of real numbers, $\mathbb{R}^n$ stands for the set of n×1 real column vectors, $\mathbb{R}^{n \times m}$ stands for the set of n×m real matrices, $\mathbb{R}_+$ (respectfully, $\overline{\mathbb{R}}_+$) stands for the set of positive (respectfully, nonnegative) real numbers, $\mathbb{R}_+^{n \times n}$ (respectfully, $\overline{\mathbb{R}}_+^{n \times n}$) stands for the set of n×n positive-definite (respectfully, nonnegative-definite) real matrices, $I_n$ stands for the n×n identity matrix, $0_n$ stands for the n×1 zero vector, $0_{nm}$ stands for the n×m zero matrix, and "$\triangleq$" stands for the equality by definition. $(\cdot)^T$ is used for the transpose, $(\cdot)^{-1}$ for the inverse, $\overline{\lambda}(A)$ (respectfully, $\underline{\lambda}(A)$) for the maximum (respectfully, minimum) eigenvalue of the matrix $A \in \mathbb{R}^{n \times n}$; $\|\cdot\|_2$ for the Euclidean norm, and $$\|A\|_2 \triangleq (\overline{\lambda}(A^T A))^{\frac{1}{2}}$$

for the induced 2-norm of the matrix $A \in \mathbb{R}^{n \times n}$.

Graph theory can be adopted in the networked multiagent systems to encode inter-agent information exchanges. Specifically, an undirected graph $\mathcal{G}$ is defined by a set $V_{\mathcal{G}}=\{1,\ldots,N\}$ of nodes and a set $\varepsilon_{\mathcal{G}} \subset V_{\mathcal{G}} \times V_{\mathcal{G}}$ of edges. If $(i,j)\in\varepsilon_{\mathcal{G}}$, then the nodes i and j are neighbors and i~j indicates the neighboring relation. The degree of anode is defined by the number of its neighbors. Letting $d_i$ be the degree of node i, the degree matrix of a graph $\mathcal{G}$, $\mathcal{D}_{\mathcal{G}}\in\mathbb{R}^{N\times N}$, has the form $\mathcal{D}_{\mathcal{G}} \triangleq \mathrm{diag}(d)$ with $d=[d_1,\ldots,d_N]$. In some examples, a graph $\mathcal{G}$ is connected when there exists a finite path $i_0 i_1 \ldots i_L$ with $i_{k-1}\sim i_k$ and $k=1,\ldots,L$ between any two distinct nodes. The adjacency matrix of a graph $\mathcal{G}$, $\mathcal{A}(\mathcal{G})\in\mathbb{R}^{N\times N}$, has the form $[\mathcal{A}(\mathcal{G})]_{ij}=1$ if $(i,j)\in\varepsilon_{\mathcal{G}}$ and $[\mathcal{A}(\mathcal{G})]_{ij}=0$ otherwise. The Laplacian matrix of a graph, $\mathcal{L}(\mathcal{G})\in\mathbb{R}^{N\times N}$, then has the form $\mathcal{L}(\mathcal{G})\triangleq\mathcal{D}(\mathcal{G})-\mathcal{A}(\mathcal{G})$. In some examples, a connected and undirected graph $\mathcal{G}$ is considered, where nodes and edges respectively represent agents and inter-agent information exchange.

In some examples, the following lemmas respectively can be stated. Lemma 2.1: The spectrum of a Laplacian matrix of a connected and undirected graph is ordered as $0=\lambda_1(\mathcal{L}(\mathcal{G}))\leq\lambda_2(\mathcal{L}(\mathcal{G}))\leq\ldots\leq\lambda_N(\mathcal{L}(\mathcal{G}))$, where $1_N$ is the eigenvector of the zero eigenvalue. Lemma 2.2: Let $\mathcal{K}=\mathrm{diag}([k_1,\ldots,k_N])$, $k_i\in\overline{\mathbb{Z}}_+$, $i=1,\ldots,N$, and consider that at least one diagonal entry of $\mathcal{K}$ is nonzero. For a connected and undirected graph $\mathcal{G}$, $\mathcal{F}(\mathcal{G})\triangleq\mathcal{L}(\mathcal{G})+\mathcal{K}\in\mathbb{R}_+^{N\times N}$ is then a positive-definite matrix. In some examples, Lemma 2.1 can be used for the result in Lemma 2.2.

At step 202, the process 200 for information exchange of an agent (e.g., a first vehicle) in a multiagent system can receive a last neighbor dataset broadcasted by a neighbor agent (e.g., a neighbor vehicle). In some examples, the last neighbor dataset is the dataset most recently received from the neighbor agent. In some examples, the networked multiagent system can include N agents, where the dynamics of agent i, i=1, . . . , N, satisfies:

$$\dot{x}_i(t)=u_i(t), x_i(0)=x_{i0}, \quad (1)$$

with $x_i(t)\in\mathbb{R}$ being the state and $u_i(t)\in\mathbb{R}$ being the control signal. For the results of this paper, we propose the control signal of agent i given by:

$$u_i(t)=-\gamma_1(x_i(t)-\hat{\mu}_i(t)), \quad (2)$$

with $\gamma_1\in\mathbb{R}_+$ being a design parameter. In addition, $\hat{\mu}_i(t)\in\mathbb{R}$ is the latest broadcast of $\mu_i(t)\in\mathbb{R}$ of agent i to its neighbors through an event-triggering approach (described in connection with step 206 below) with $\mu_i(t)$. Thus, the last dataset (e.g., the last vehicle dataset) can include a datset previously transmitted to the agent (e.g., the first vehicle) in response to the violation, which is described further in conenction with step 206 below. Similarly, $\hat{\mu}_j(t)\in\mathbb{R}$ is the latest broadcast of $\mu_j(t)\in\mathbb{R}$ of neighbor agent j (e.g., the neightbor vehicle) to agent i (e.g., the first vehicle) through the event-triggering approach with $\mu_j(t)$.

At step 204, the process 200 determines a current dataset $(\mu_i(t))$ based on the last neighbor dataset and a last dataset (e.g., a last vehicle dataset) of the agent (e.g., the first vehicle). In some examples, the last dataset $(\hat{\mu}_i(t))$ is a dataset most recently broadcasted to the neighbor agent. In some examples, the current dataset $(\mu_i(t))$ can be referred to as auxiliary or virtual network, which is used in the even-triggering condition. In further examples, the current dataset $(\mu_i(t))$ can have a sole purpose to be used in the event-triggering condition. The network can be constructed based on the real multi-agent system network, which represents the actual physical system. In some examples, the trajectory information (e.g., the command (c(t)) is only available to the leader agent(s) in the network. For example, the current dataset can be defined as:

$$\dot{\mu}_i(t)=-\gamma_2[\Sigma_{i\sim j}(\hat{\mu}_i(t)-\hat{\mu}_j(t))+k_i(\hat{\mu}_i(t)-c(t))], \mu_i(0)=\mu_{i0}. \quad (3)$$

Here, $\gamma_2\in\mathbb{R}_+$ is also a design parameter, $k_i\in\{0,1\}$ denotes whether agent i is a leader or a follower (i.e., $k_i=0$ for follower agents and $k_i=1$ for leader agents), $c(t)\in\mathbb{R}$ is a command, and $\hat{\mu}_j(t)$ for i~j denotes the latest broadcasted value of $\mu_j(t)$ from agent j to its neighbors through an event-triggering approach (details below). In some examples, the control alw of the current dataset $(\mu_i(t))$ can depend on the information received by agent i from its neighbors (i~j).

Figure 3:
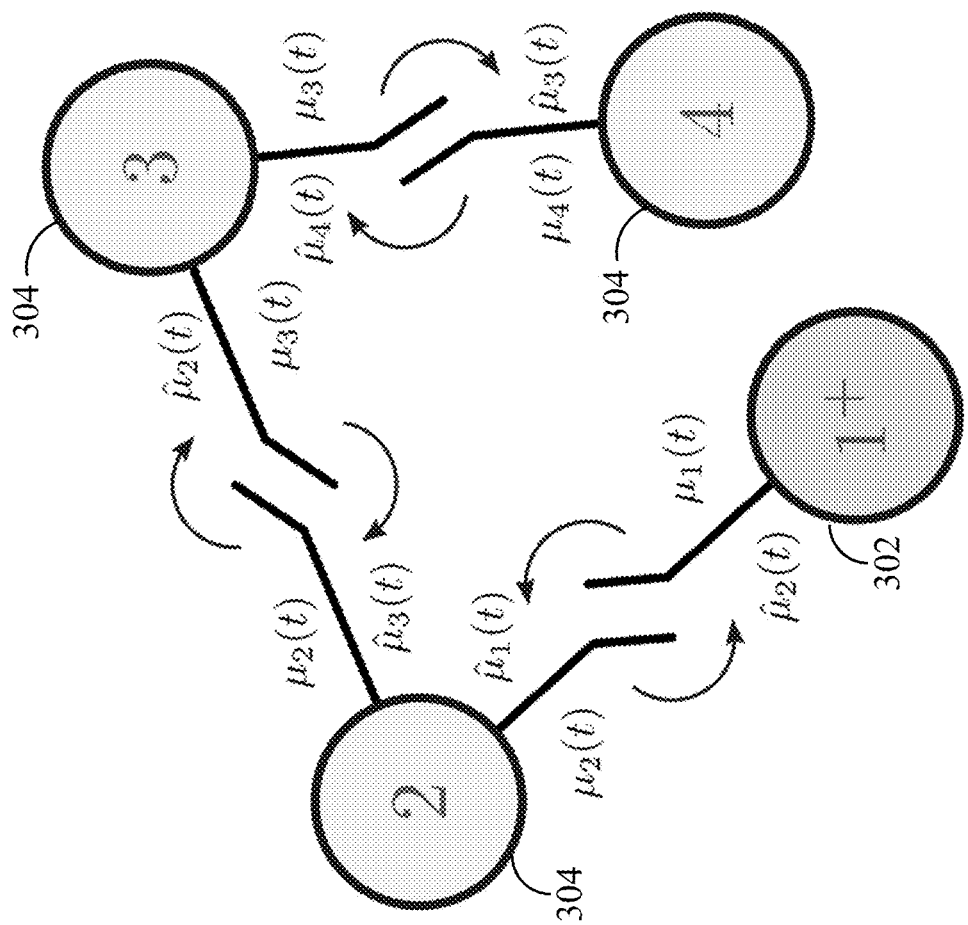
FIG. 3 is an example multiagent system according to some embodiments.

FIG. 3 graphically illustrates our problem formulation. Specifically, consider 4 agents with a leader agent 302 without loss of generality. Other agents are follower agents 304. Here, a distributed event-triggered control architecture can be established. The distributed event-triggered control architecture is predicated on a dynamical threshold and solution-predictor curves exchange, such that this architecture minimizes inter-agent communication and it also allows all agents to follow a desired command, c(t), available only to the leader agents (i.e., agent 1 in FIG. 3).

In some examples, the first vehicle can be a leader vehicle, and the current dataset can be determined further based on a command. For example, the current dataset can be defined as: $\dot{\mu}_i(t)=-\gamma_2[\Sigma_{i\sim j}(\hat{\mu}_i(t)-\hat{\mu}_j(t))+\hat{\mu}_i(t)-c(t)]$, where $\mu_i(t)$ is the current dataset, $\gamma_2$ is a design parameter, $\hat{\mu}_i(t)$ is the last vehicle dataset, $\hat{\mu}_j(t)$ is the last neighbor dataset, and c(t) is the command. In further examples, the first vehicle can be a follower vehicle. In the examples, the current dataset can be defined as: $\dot{\mu}_i(t)=-\gamma_2[\Sigma_{i\sim j}(\hat{\mu}_i(t)-\hat{\mu}_j(t))]$, where $\mu_i(t)$ is the current dataset, $\gamma_2$ is a design parameter, $\hat{\mu}_i(t)$ is the last vehicle dataset, and $\hat{\mu}_j(t)$ is the last neighbor dataset. In some examples, using the control signal of agent i given by (2), (1) can be rewritten as:

$$\dot{x}_i(t)=-\gamma_1(x_i(t)-\hat{\mu}_i(t)) \quad (4)$$

In some exaples, agent i dynamics given by (4) has the latest broadcasted value of $\mu_i(t)$ to its neighbors (i.e., $\hat{\mu}_i(t)$). Yet, agent i has continuous access to its value of $\mu_i(t)$ through (3). Ideal continuous information exchange dynamics can be formalized to be defined as:

$$\dot{x}_{mi}(t)=-\gamma_1(x_{mi}(t)-\mu_i(t)), x_{mi}(0)=x_{mi0}, \quad (5)$$

where $x_{mi}(t)\in\mathbb{R}$. Henceforth, (5) can be referred to as the ideal reference model of agent i.

Referring again to FIG. 2, at step 206, the process 200 identifies a violation of an event-triggering condition by comparing a difference between the last vehicle dataset and the current dataset with a dynamic threshold. In some examples, the dynamic threshold can be defined by an exponentially decaying term and an error between a vehicle state of the first vehicle and a reference state. For example, the event-triggering condition can be defined as:

$$\|\tilde{\mu}_i(t)\|_2\leq\varepsilon\|e_i(t)\|_2+\phi(t), \quad (6)$$

where $\varepsilon\in\mathbb{R}_+$ is a design parameter, $\tilde{\mu}_i(t)\triangleq\hat{\mu}_i(t)-\mu_i(t)\in\mathbb{R}$ is the difference between the latest broadcasted value $\hat{\mu}_i(t)$ (i.e., the last vehicle dataset) and the current value of $\mu_i(t)$ (i.e., the current dataset) of agent i, $e_i(t)\triangleq x_i(t)-x_{mi}(t)\in\mathbb{R}$ is the error between the state $x_i(t)$ of agent i (e.g., the vehicle state of the first vehicle) and its reference model state $x_{mi}(t)$ (e.g., the reference state). Thus, the event-triggering condition can be rewritten as: $\|\hat{\mu}_i(t)-\mu_i(t)\|_2 \le \varepsilon\|e_i(t)\|_2+\phi(t)$. In further examples, $\phi(t) \in \overline{\mathbb{R}}_+$ is an exponentially decaying term satisfying:

$$\dot{\phi}(t)=-\kappa(\phi(t)-\phi_f), \phi(t)=\phi_0. \quad (7)$$

In (7), $\kappa \in \mathbb{R}_+$ denotes the time constant of $\phi(t)$ and $\phi_f \in \overline{\mathbb{R}}_+$ denotes the final value of $\phi(t)$. In some examples, the final value to which $\phi(t)$ converges to, $\phi_f$, in (7) can be practically chosen such that $\phi_f < \phi_0$. This condition is desirable to keep $\phi(t)$ exponentially decaying to $\phi_f$ from $\phi_0$. In addition, if the final value of $\phi(t)$, $\phi_f$, is set to zero, then asymptotic stability is achieved. On the other hand, if $\phi_f \in (0, \phi_0)$, then boundedness is achieved.

At step 208, the process 200 determines a transmission dataset being associated with the current dataset. In some examples, two scenarios can be considered for the event-triggering condition given by (6). In some scenarios, the transmission dataset can include sampled data of the current dataset. When the event-triggering condition given by (6) is violated, agent i (e.g., the first vehicle) broadcasts a sampled data (i.e., the transmission dataset $\hat{\mu}_i(t)$) of its value $\mu_i(t)$ (i.e., $\hat{\mu}_i(t)=\mu_i(t_{di})$ for $t \in [t_{di}, t_{(d+1)i})$) through a zero-order-hold operator to its neighbors. In some examples, the sequences $\{t_{di}\}_{d \in N}$ for i=1, ..., N contain all time instants when (6) is violated.

In other scenraios, the transmission dataset can include a parameter for a solution-predictor curve to estimate the current dataset. When the event-triggering rule given by (6) is violated, agent i broadcasts a solution-predictor curve (i.e., $\mathcal{S}_{di}(t)$) of the current dataset (i.e., $\mu_i(t)$) to its neighbors. In this scenario, the transmission dataset (i.e., $\hat{\mu}_i(t)$) to be broadcasted. This can be expressed as: $\hat{\mu}_i(t)=\mathcal{S}_{di}(t)$ for $t \in [t_{di}, t_{(d+1)i})$, where the sequences $\{t_{di}\}_{d \in N}$ for i=1, ..., N contain all time instants when (6) is violated.

For example, in the scenarios, the dynamics of agent i (e.g., the first vehicle) can be given by (3). When an event occurs (i.e., (6) is violated) at time $t=t_{di}$, the solution of (3) using the initial condition $\mu_i(t_{di})$ and the inputs $\hat{\mu}_j(t_{dj})$ and $c(t_{di})$ can be estimated as:

$$S_{di}(t) = \left(\hat{\mu}_{i0} - \frac{\sum_{i \sim j} \hat{\mu}_j(t_{dj}) + k_i c(t_{di})}{d_i + k_i}\right) e^{-\gamma_2 d_i(t-t_0)} + \frac{\sum_{i \sim j} \hat{\mu}_j(t_{dj}) + k_i c(t_{di})}{d_i + k_i} \quad (8)$$

In some examples, (8) predicts the evolution of $\mu_i(t)$ for agent i over time. The parameter (degree) $d_i$ for agent i can be the number of nighbor agents to agent i. This depends on the network topology. Network topology and leader location have an effect on the total number of events. Every agent in the networked multiagent system stores a function in the form given by (8) for each of its neighbors. Thus, the parameter of the transmission dataset for the solution-predictor of aggent i (e.g., the first vehicle) can include an initial condition $\mu_i(t_{di})$ and a solution-predictor parameter defined by the last neighbor dataset $\hat{\mu}_j(t_{dj})$ of the agaent i (e.g, the first vehicle). In further examples, the solution-predictor parameter can be defined further by a degree $d_i$ and a control signal $c(t_{di})$ (when the agent i is a leader agent). When an event occurs, agent i broadcasts to its neighbors $\hat{\mu}_{i0}=\mu_i(t_{di})$, $t_0=t_{di}$, and the solution-predictor parameter of $(\Sigma_{i \sim j} \hat{\mu}_j(t_{dj})+k_i c(t_{di}))/(k_i+d_i)$. In some examples, the event-triggering condition can be used for both sampled-data exchanges and solution-predictor curve exchanges. In further examples, the solution-predictor curve can estimate the value of $\mu_j(t)$ for agent i in some extent. Thus, the solution-predictor curve can reduce the number of events to be triggered and the fequecy at which event occur.

At step 210, the process 200 broadcasts the transmission dataset (i.e., $\hat{\mu}_i(t)$) to the neighbor agent (e.g., the neighbor vehicle) in response to the violation. For example, when the agent is agent 1 (302) in FIG. 3, the agent 1 transmits the transmission dataset to the neighbor agent (i.e., agent 2). Similarly, when the agent is agent 2 (304), the agent 2 transmits the transmission dataset to the neighbor agents (i.e., agent 1 and agent 3). In some examples of the process 200, agents can be modeled with a single integrator, which simplifies the expression of the solution-predictor. In further examples of the process 200, agents can be modeled with a linear system, and hence expression of the solution-predictor curve can change.

System-Theoretical Analysis: To establish the stability properties of the event-triggering approach for networked multiagent systems, the aggregated state vector can be defined as $x(t) \triangleq [x_1(t), \ldots, x_N(t)] \in \mathbb{R}^N$. In addition, the aggregated reference model state vector can be defined as $x_m(t) \triangleq [x_{m1}(t), \ldots, x_{mN}(t)] \in \mathbb{R}^N$, the aggregated error vector as $e(t) \triangleq [e_1(t), \ldots, e_N(t)] \in \mathbb{R}^N$, the aggregated $\mu(t)$ vector as $\mu(t) \triangleq [\mu_1(t), \ldots, \mu_N(t)] \in \mathbb{R}^N$, and the aggregated $\hat{\mu}(t)$ vector as $\hat{\mu}(t) \triangleq [\hat{\mu}_1(t), \ldots, \hat{\mu}_N(t)] \in \mathbb{R}^N$. Then, the overall system error dynamics can be written as:

$$\dot{e}(t) = \quad (9)$$
$$\dot{x}(t) - \dot{x}_m(t) = -\gamma_1(x(t) - \hat{\mu}(t)) - (-\gamma_1(x_m(t) - \mu(t))) = -\gamma_1 e(t) - \gamma_1 \tilde{\mu}(t),$$

where $\tilde{\mu}(t) \triangleq \hat{\mu}(t) - \mu(t) \in \mathbb{R}^N$.

Next, overall dynamics of $\mu(t)$ can be rewritten as:

$$\dot{\mu}(t) = -\gamma_2[\mathcal{L}\hat{\mu}(t) + \mathcal{K}(\hat{\mu}(t) - c(t))] = \quad (10)$$
$$-\gamma_2[(\mathcal{L} + \mathcal{K})\hat{\mu} - \mathcal{K}c(t)] = -\gamma_2[\mathcal{F}\hat{\mu}(t) - \mathcal{K}c(t)].$$

Here $\mathcal{L} \in \mathbb{R}^{N \times N}$ is the Laplacian matrix of the connected and undirected graph, and $\mathcal{F} \in \mathbb{R}_+^{N \times N}$ and $\mathcal{K} \in \mathbb{R}^{N \times N}$ are defined in Lemma 2.2. Now, the auxiliary ideal dynamics considering continuous inter-agent information exchange can be defined as:

$$\dot{\mu}_m(t) = -\gamma_2[\mathcal{F}\mu_m(t) - \mathcal{K}c(t)], \quad (11)$$

where $\mu_m(t) \in \mathbb{R}^N$. Let the error between the dynamics given by (10) and (11) be defined as $\bar{\mu}(t) \triangleq \mu(t) - \mu_m(t) \in \mathbb{R}^N$, and the error can be written as:

$$\dot{\bar{\mu}}(t)=-\gamma_2 \mathcal{F}\bar{\mu}(t)-\gamma_2 \mathcal{F} \tilde{\mu}. \quad (12)$$

Now, the following lemma for the upcoming system-theoretical stability analysis of the event-triggered distributed control architecture can be presented. Lemma 4.1: Consider the agent-wise event-triggering rule given by (6). For the overall networked multiagent system, the following inequality then holds:

$$\|\tilde{\mu}(t)\|_2 \le \varepsilon\|e(t)\|_2+\sqrt{N}\phi(t) \quad (13)$$

Proof: Considering the agent-wise event-triggering rule given by (6) one can write:

$$\begin{bmatrix} \|\tilde{\mu}_1(t)\|_2 \\ \vdots \\ \|\tilde{\mu}_N(t)\|_2 \end{bmatrix} \leq \varepsilon \begin{bmatrix} \|e_1(t)\|_2 \\ \vdots \\ \|e_N(t)\|_2 \end{bmatrix} + 1_N \phi(t). \quad (14)$$

In some examples, all elements of the vectors on both sides of the inequality in (14) are positive. Thus, taking norm of both sides of (14) yields:

$$\left\| \begin{bmatrix} \|\tilde{\mu}_1(t)\|_2 \\ \vdots \\ \|\tilde{\mu}_N(t)\|_2 \end{bmatrix} \right\|_2 \leq \left\| \varepsilon \begin{bmatrix} \|e_1(t)\|_2 \\ \vdots \\ \|e_N(t)\|_2 \end{bmatrix} + 1_N \phi(t) \right\|_2 \leq \varepsilon \left\| \begin{bmatrix} \|e_1(t)\|_2 \\ \vdots \\ \|e_N(t)\|_2 \end{bmatrix} \right\|_2 + \sqrt{N} \phi(t). \quad (15)$$

When applying the fact that $\|[\|\tilde{\mu}_1(t)\|_2 \ldots \|\tilde{\mu}_N(t)\|_2]^T\|_2 = \|[\tilde{\mu}_1(t) \ldots \tilde{\mu}_N(t)]^T\|_2$ and $\|[\|e_1(t)\|_2 \ldots \|e_N(t)\|_2]^T\|_2 = \|[e_1(t) \ldots e_N(t)]^T\|_2$ in (15), the results in (13) become immediate.

Then, $\mathcal{O}$ can be defined as:

$$\mathcal{O} = \begin{bmatrix} \gamma_1\left(1-\varepsilon-\dfrac{1}{\overline{\sigma}_1}\right) & 0 & 0 \\ 0 & \gamma_2\rho_1(\underline{\lambda}(\mathcal{F})-\overline{\rho}_1) & 0 \\ 0 & 0 & \overline{\rho}_2 \end{bmatrix} \quad (16)$$

where $\overline{\sigma}_1 \in \mathbb{R}_+$, $\overline{\rho}_1 \in \mathbb{R}_+$, and $\overline{\rho}_2 \in \mathbb{R}_+$ are free parameters to ensure the positive definiteness of $\mathcal{O} \in \mathbb{R}_+^{3\times 3}$, which is guaranteed when all its diagonal entries $D_k(\mathcal{O})$ for k=1, 2, 3 given by:

$$D_1(\mathcal{O}) = \gamma_1\left(1-\varepsilon-\dfrac{1}{\overline{\sigma}_1}\right), \quad (17)$$

$$D_2(\mathcal{O}) = \gamma_2\rho_1(\underline{\lambda}(\mathcal{F})-\overline{\rho}_1), \quad (18)$$

$$D_3(\mathcal{O}) = \overline{\rho}_2. \quad (19)$$

are positive. Specifically, from (17), $D_1(\mathcal{O}) > 0$ imposes the condition $\varepsilon < 1 - 1/\overline{\sigma}_1$. Observe that $\overline{\sigma}_1$ can be chosen judiciously large such that $1 - 1/\overline{\sigma}_1 \approx 1$ holds. In addition, one can always choose $\overline{\rho}_1 < \mathcal{F}$ such that $D_2(\mathcal{O})$ in (18) is positive. Finally, the positiveness of $D_3(\mathcal{O})$ in (19) automatically holds.

Now, the system-theoretical stability analysis of the architecture can be presented. Theorem 4.1: Consider a networked multiagent system consisting of N agents with the dynamics of agent i, i=1, ..., N, given by (1), (2), (3), and the reference model given by (5). In addition, consider the event-triggering rule for scheduling inter-agent information exchange given by (6) and (7) subject to a) sampled data and b) solution-predictor curves. When $\varepsilon < 1/\sqrt{2}$ the solution (e(t), $\overline{\mu}$(t),$\phi$(t)) of the closed-loop dynamical system is stable and $\lim_{t\to\infty}(e(t),\overline{\mu}(t),\phi(t)) = (0,0,0)$ for $\phi_f = 0$, and it is bounded for $\phi_f \in (0,\phi_0)$.

Proof. Consider the Lyapunov-like function candidate given by:

$$\mathcal{V}(e, \overline{\mu}, \phi) = \dfrac{1}{2} e^T e + \dfrac{1}{2}\rho_1 \overline{\mu}^T \overline{\mu} + \dfrac{1}{2}\rho_2 \phi^2, \quad (20)$$

where $\rho_1 \in \mathbb{R}_+$ and $\rho_2 \in \mathbb{R}_+$ are free parameters. Note that $V(0,0,0)=0$, $V(e,\overline{\mu},\phi)>0$ for $(e,\overline{\mu},\phi)\neq(0,0,0)$, and $V(e,\overline{\mu},\phi)$ is radially unbounded. Taking time-derivative of (20) along system trajectories yields:

$$\dot{\mathcal{V}}(e(t),\overline{\mu}(t),\phi(t)) = e^T(t)\dot{e}(t) + \rho_1 \overline{\mu}^T(t)\dot{\overline{\mu}}(t) + \rho_2 \phi(t)\dot{\phi}(t). \quad (21)$$

Next, using (7), (9), and (12) in (21), one can write $$\dot{\mathcal{V}}(e(t),\overline{\mu}(t),\phi(t)) = -\gamma_1 e^T(t) e(t) - \gamma_1 e^T(t)\tilde{\mu}(t) - \gamma_2 \rho_1 \overline{\mu}^T(t)\mathcal{F} \overline{\mu}(t) - \gamma_2 \rho_1 \overline{\mu}^T(t)\mathcal{F}\tilde{\mu}(t) - \rho_2 \kappa \phi^2(t) + \rho_2 \kappa \phi(t)\phi_f \leq -\gamma_1 \|e(t)\|_2^2 + \gamma_1\|e(t)\|_2\|\tilde{\mu}(t)\|_2 - \gamma_2 \rho_1 \underline{\lambda}(\mathcal{F})\|\overline{\mu}(t)\|_2^2 + \gamma_2 \rho_1 \mathcal{F}\|\overline{\mu}(t)\|_2\|\tilde{\mu}(t)\|_2 - \rho_2 \kappa \phi^2(t) + \rho_2 \kappa \phi(t)\phi_f. \quad (22)$$

Next, note that the event-triggering rule given by (6) that yields (13) based on Lemma 4 holds for both a) sampled data and b) solution-prediction curve. Hence, using (13) in (22), one can write:

$$\dot{\mathcal{V}}(e(t),\overline{\mu}(t),\phi(t)) \leq -\gamma_1 \|e(t)\|_2^2 - \gamma_2 \rho_1 \underline{\lambda}(\mathcal{F})\|\overline{\mu}(t)\|_2^2 - \rho_2 \kappa \phi^2(t) + \rho_2 \kappa \phi(t)\phi_f + \gamma_1 \varepsilon \|e(t)\|_2^2 + \sqrt{N}\gamma_1 \phi(t)\|e(t)\|_2 + \gamma_2 \rho_1 \varepsilon \overline{\lambda}(\mathcal{F})\|\overline{\mu}(t)\|_2 \|e(t)\|_2 + \sqrt{N}\gamma_2 \rho_1 \overline{\lambda}(\mathcal{F})\phi(t)\|\overline{\mu}(t)\|_2. \quad (23)$$

Applying Young's inequality $ab \leq (1/2)(\sigma^{-1}a^2 + \sigma b^2)$ on the fourth, fifth, and sixth terms in (23) yields:

$$\dot{\mathcal{V}}(e(t), \overline{\mu}(t), \phi(t)) \leq -\gamma_1(1-\varepsilon)\|e(t)\|_2^2 - \gamma_2\rho_1 \underline{\lambda}(\mathcal{F})\|\overline{\mu}(t)\|_2^2 - \rho_2 \kappa \phi^2(t) + \rho_2 \kappa \phi(t)\phi_f + \dfrac{1}{2\sigma_1}\|e(t)\|_2^2 + \dfrac{\sigma_1}{2}\gamma_1^2 N \phi^2(t) + \dfrac{1}{2\sigma_2}\|e(t)\|_2^2 + \dfrac{\sigma_2}{2}\gamma_2^2\rho_1^2 \varepsilon^2 \overline{\lambda}^2(\mathcal{F})\|\overline{\mu}(t)\|_2^2 + \dfrac{\sigma_3}{2}\|\overline{\mu}(t)\|_2^2 + \dfrac{1}{2\sigma_3}N\gamma_2^2\rho_1^2 \overline{\lambda}^2(\mathcal{F})\phi^2(t), \quad (24)$$

with $\sigma_1 \in \mathbb{R}_+$, $\sigma_2 \in \mathbb{R}_+$, and $\sigma_3 \in \mathbb{R}_+$ being free design parameters. Then, it follows:

$$\dot{\mathcal{V}}(e(t), \overline{\mu}(t), \phi(t)) \leq -\gamma_1\left(1-\varepsilon-\dfrac{1}{\gamma_1\sigma_1}-\dfrac{1}{\gamma_1\sigma_2}\right)\|e(t)\|_2^2 + \rho_2 \kappa \phi(t)\phi_f - \left(\gamma_2\rho_1\underline{\lambda}(\mathcal{F}) - \dfrac{\sigma_2}{2}\gamma_2^2\rho_1^2\varepsilon^2\overline{\lambda}^2(\mathcal{F}) - \dfrac{\sigma_3}{2}\right)\|\overline{\mu}(t)\|_2^2 - \left(\rho_2\kappa - \dfrac{\sigma_2}{2}\gamma_1^2 N - \dfrac{1}{2\sigma_3}N\gamma_2^2\rho_1^2\overline{\lambda}^2(\mathcal{F})\right)\phi^2(t). \quad (25)$$

Next, (27) can be identically rewritten as:

$$\dot{\mathcal{V}}(e(t), \overline{\mu}(t), \phi(t)) \leq -\gamma_1\left(1-\varepsilon-\dfrac{1}{\overline{\sigma}_1}\right)\|e(t)\|_2^2 + \rho_2\kappa\phi(t)\phi_f - \gamma_2\rho_1(\underline{\lambda}(\mathcal{F})-\overline{\rho}_1)\|\overline{\mu}(t)\|_2^2 - \overline{\rho}_2\phi^2(t), \quad (26)$$

where $\sigma_1 = (2\overline{\sigma}_1)/(\gamma_1)$, $\sigma_2 = (2\overline{\sigma}_1)/(\gamma_1)$, $\rho_1 = \overline{\rho}_1/(\sigma_2\gamma_2\varepsilon^2\overline{\lambda}(\mathcal{F}))$, $\sigma_3 = \sigma_2\gamma_2^2\rho_1^2\varepsilon^2\overline{\lambda}^2(\mathcal{F})$, and $\rho_2 = \kappa^{-1}(\overline{\rho}+(1/2)\sigma_2\gamma_1^2 N + (1/2\sigma_3)N\gamma_2^2\rho_1^2\overline{\lambda}^2(\mathcal{F}))$.

By letting $\xi(t) \triangleq [e(t),\overline{\mu}(t),\phi(t)]$, (23) can be now compactly rewritten as:

$$\dot{\mathcal{V}}(e(t),\overline{\mu}(t),\phi(t)) \leq -\xi^T(t)\mathcal{O}\xi(t) + \Gamma\xi(t), \quad (27)$$

where $\Gamma \triangleq [0,0,\rho_2\kappa\phi_f]$. It immediately follows from (27) that the closed-loop solution (e(t),$\overline{\mu}$(t),$\phi$(t)) is Lyapunov stable and $\lim_{t\to\infty}(e(t),\overline{\mu}(t),\phi(t)) = (0,0,0)$ for $\phi_f = 0$ since $\mathcal{O}$ is positive-definite and $\Gamma$ in (27) is zero in this case.

It follows from (28) that there exists a compact set $C \triangleq \{\xi(t):\xi(t) \leq \Gamma/\mathcal{O}\}$ such that $\dot{V}(e(t),\overline{\mu}(t),\phi(t)) \leq 0$ outside of this set. Boundedness of the closed loop solution (e(t), $\overline{\mu}$(t),$\phi$(t)) is now immediate.

Parameter Tuning Guidelines: Practical guidelines are provided to tune the parameters of the event-triggering architecture for scheduling inter-agent information exchange in a networked multiagent systems. Here, the direct or indirect effect of each parameter is shown on the total number of events through illustrative numerical examples. Specifically, consider the following parameters: $\varepsilon$ from (6), $\gamma_1$ from (2), $\gamma_2$ from (3), and $\phi_0$ and $\phi_f$ from (7). In addition, the position of the leader agent in the networked multiagent system can also affect the total number of events.

In some examples, a system including 4 agents is used such that the first agent can communicate with the second agent, the second agent can communicate with the first agent and the third agent, the third agent can communicate with the second agent and the fourth agent, and finally the fourth agent can communicate with the third agent, as illustrated in FIG. 3. In this figure, without loss of generality, the first agent is chosen as the leader. In some of the following numerical simulation and experimental results, the leader agent is altered to show the effect of leader agent location as well.

Each example is run with sampling rate of 10 Hertz in Python on a Windows 10 personal computer. Moreover, four different Python scripts are run in parallel, one for each agent. Time is synchronized through system time and each script shares its calculated values (e.g., shared variables described above) when an event occurs according to FIG. 3. Initial conditions are set as $x_{10}=3.2$ m, $x_{20}=2.3$ m, $x_{30}=1.4$ m, and $x_{40}=0.5$ m, and the command is given by:

$$c(t) = \begin{cases} A & \text{if } 0 < t \le 25, \\ A+B & \text{if } 25 < t \le 50, \\ A-B & \text{if } 50 < t \le 75, \end{cases} \quad (29)$$

where $A=(x_{10}+x_{20}+x_{30}+x_{40})/4$ and $B=1.2$.

Tuning $\varepsilon$: The $\varepsilon$ parameter scales the event-triggering threshold as it is an immediate observation from (6). In particular, small values of $\varepsilon$ lead to an increase of the total number of events. Note that $\varepsilon$ parameter is constrained to the interval $\varepsilon \in (0, 1/\sqrt{2})$ for system stability.

Figure 4:
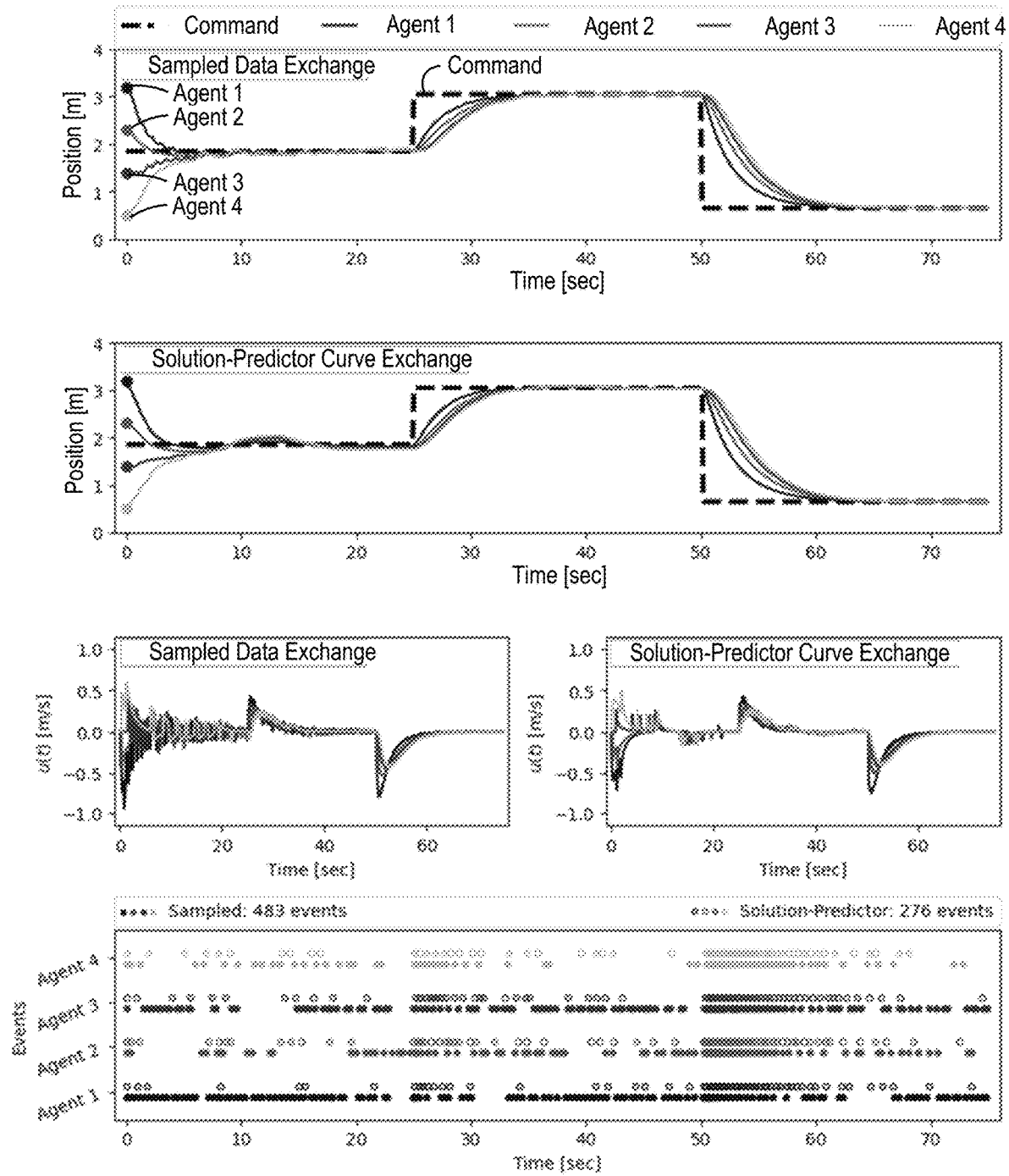
FIG. 4 shows results of an example event-triggering approach with sampled data exchange and solution-predictor curve exchange with $\varepsilon=0.1$.
Figure 5:
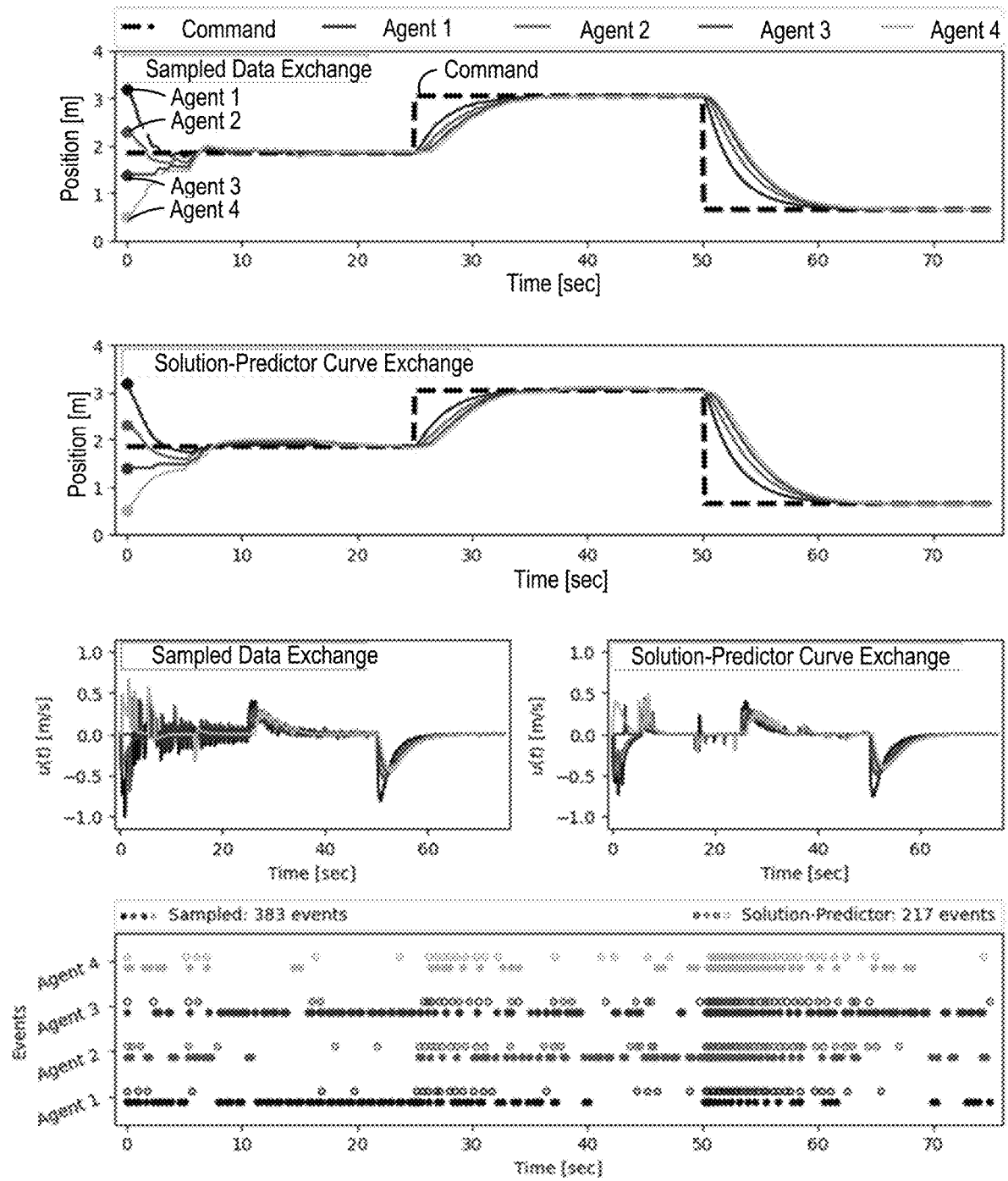
FIG. 5 shows results of an example event-triggering approach with sampled data exchange and solution-predictor curve exchange with $\varepsilon=0.7$.

The numerical examples can be run using the event-triggering approach with both event-triggering scenarios: a) sampled data exchange and b) solution-predictor curve exchange. $\varepsilon \in \{0.1, 0.7\}$ can be set, and the rest of the parameters can be chosen as $\gamma_1=0.7$, $\gamma_2=2.5$, $\phi_0=0.5$, and $\phi_f=0$. Results are shown in FIGS. 3 and 4 for $\varepsilon=0.1$ and $\varepsilon=0.7$, respectively. When $\varepsilon=0.1$ higher number of events are observed as compared to $\varepsilon=0.7$ for both event-triggering scenarios. On the other hand, performance-wise, both $\varepsilon=0.1$ and $\varepsilon=0.7$ produce almost similar results.

Tuning $\gamma_1$ and $\gamma_2$: The parameters $\gamma_1$ and $\gamma_2$ respectively regulate the rate of convergence of each agent's dynamics and the corresponding $\mu(t)$-dynamics (see equations (1) and (3)). Both parameters have an indirect effect on the number of events. Based on our observation, $\gamma_2$ can be selected larger than $\gamma_1$ to maintain the desired performance, even though selecting $\gamma_1=\gamma_2$ may decrease the number of events yet may lead to undesirable system response. To give some intuition on how the variation of $\gamma_1$ and $\gamma_2$ parameters affect the total number of events, simulation results are summarized for $\gamma_1 \in \{0.3, 0.7, 1.1, 1.5\}$, $\gamma_2 \in \{1.5, 2.5, 3.5, 4.5\}$, $\varepsilon=0.7$, $\phi_0=0.5$, and $\phi_f=0$ in Table 1 and Table 2 for exchanging sampled data and solution-predictor curve, respectively. Note that some of simulation results presented within these tables have undesirable performance despite their low number of events, where we make them bold in these tables. Selection of $\gamma_1$ and $\gamma_2$ parameters should be done judiciously to reflect the desired level of network utilization and system performance.

TABLE 1

Summary of the effect of parameters $\gamma_1$ and $\gamma_2$ on the number of events for exchanging sampled data between neighboring agents.

| | | $\gamma_2$ | | | |
|---|---|---|---|---|---|
| | | 1.5 | 2.5 | 3.5 | 4.5 |
| $\gamma_1$ | 0.3 | 484 | 658 | 484 | 677 |
| | 0.7 | 360 | 442 | 581 | 431 |
| | 1.1 | 282 | 422 | 619 | 619 |
| | 1.5 | 229 | 253 | 431 | 629 |

TABLE 2

Summary of the effect of parameters $\gamma_1$ and $\gamma_2$ on the number of events for exchanging solution-predictor curves between neighboring agents.

| | | $\gamma_2$ | | | |
|---|---|---|---|---|---|
| | | 1.5 | 2.5 | 3.5 | 4.5 |
| $\gamma_1$ | 0.3 | 233 | 215 | 256 | 329 |
| | 0.7 | 211 | 187 | 254 | 284 |
| | 1.1 | 197 | 219 | 243 | 300 |
| | 1.5 | 199 | 200 | 232 | 284 |

Figure 6:
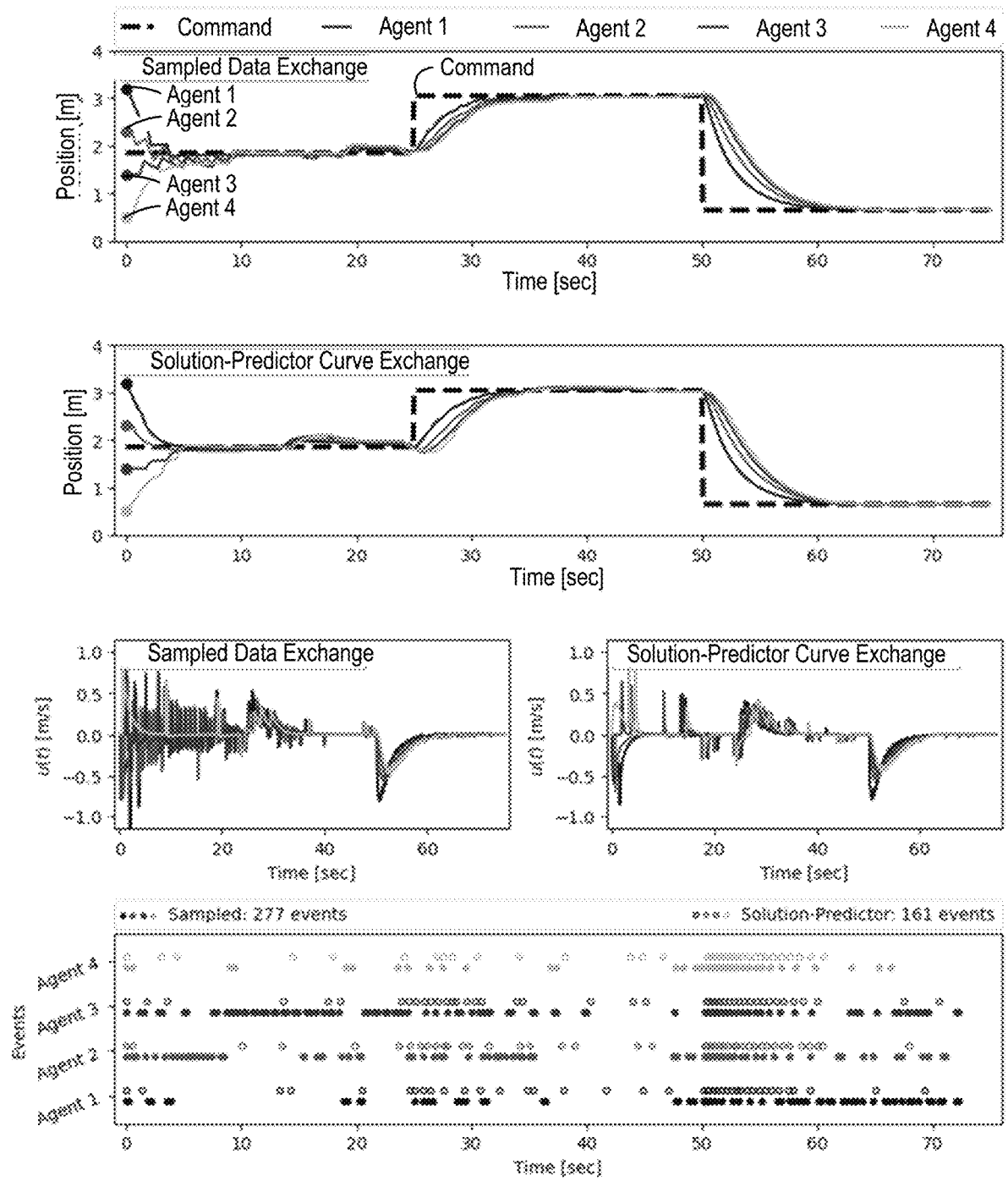
FIG. 6 shows results of an example event-triggering approach with sampled data exchange and solution-predictor curve exchange with $\phi_0=1$ and $\phi_f=0$.

Tuning $\phi_0$ and $\phi_f$: The parameters $\phi_0$ and $\phi_f$ from (7) have a direct effect on the number of events. In particular, $\phi_0$ can be used to adjust the event-triggering threshold initially. Thus, its higher values results in lower number of events and its lower values results in higher number of events. Note that initial system response may be degraded when $\phi_0$ is set relatively high. To elucidate this point, consider FIGS. 6 and 7, where $\phi_0=1$ and $\phi_0=0.5$ respectively with $\phi_f=0$, $\gamma_1=0.7$, $\gamma_2=2.5$, and $\varepsilon=0.7$. Immediate observation from both figures is the lower number of events on the system response with $\phi_0=1$ as compared with the system response for $\phi_0=0.5$ for both event-triggering scenarios a) sampled data exchange and b) solution-predictor curve exchange.

Figure 7:
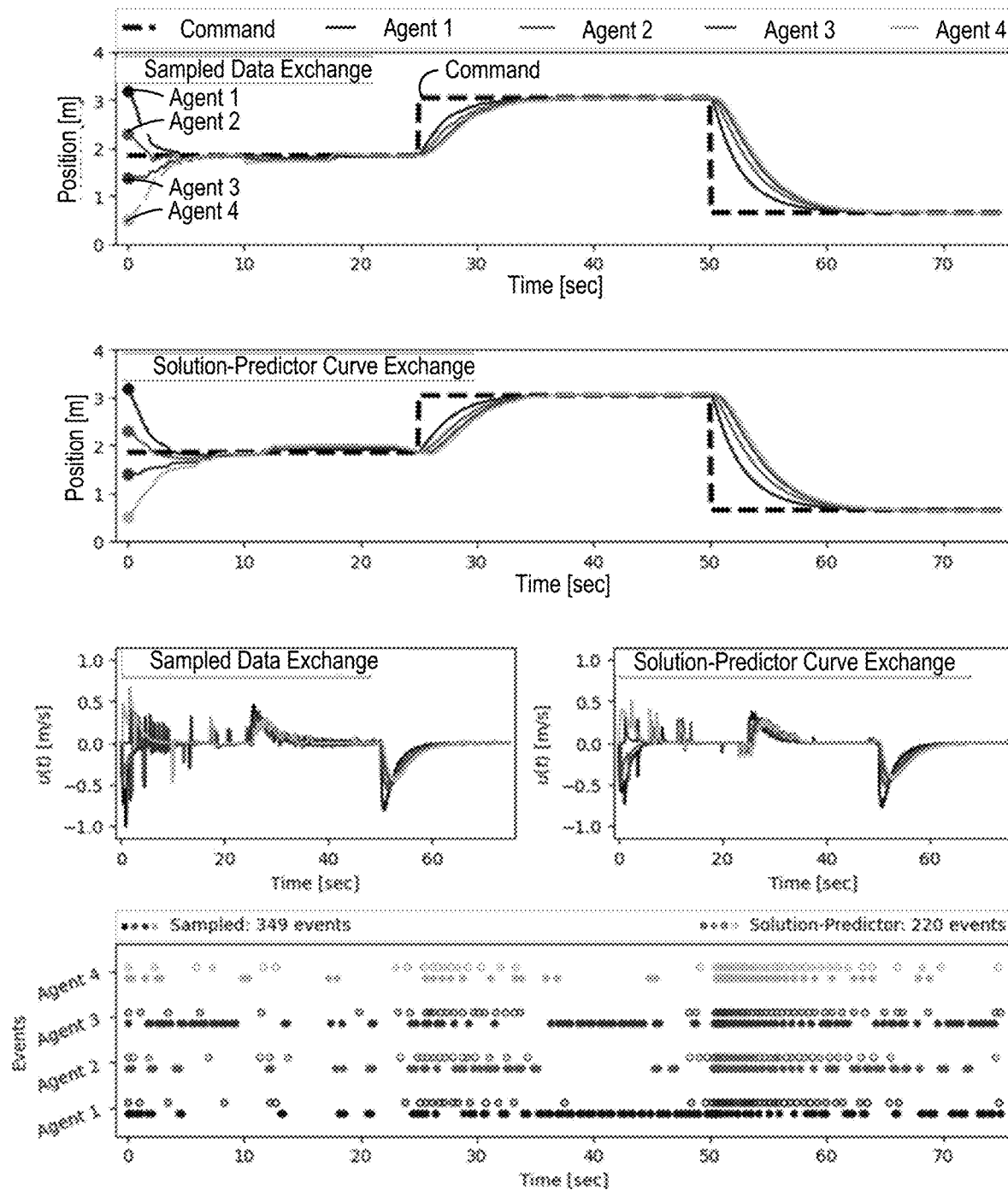
FIG. 7 shows results of an example event-triggering approach with sampled data exchange and solution-predictor curve exchange with $\phi_0=0.5$ and $\phi_f=0$.
Figure 8:
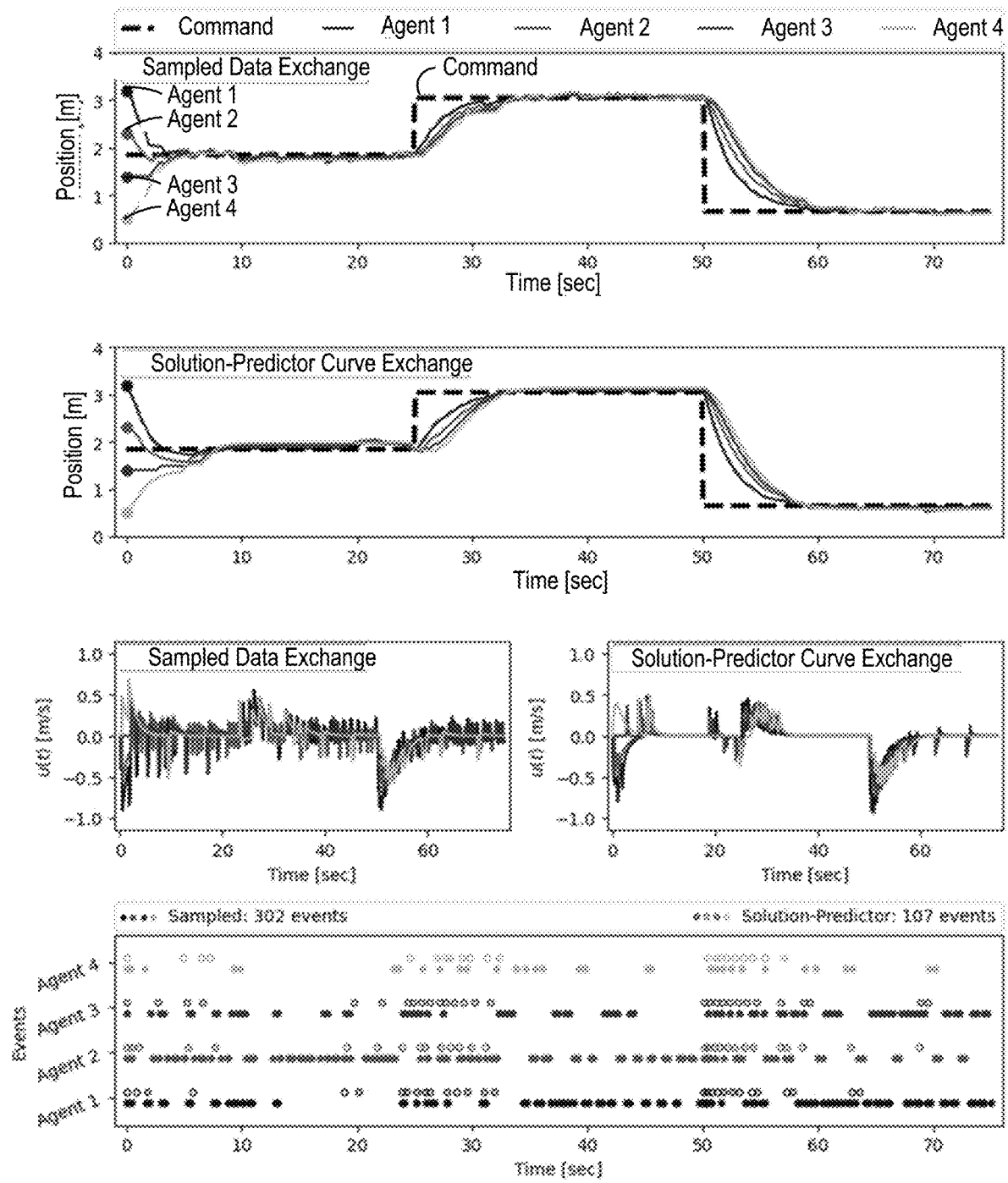
FIG. 8 shows results of an example event-triggering approach with sampled data exchange and solution-predictor curve exchange with $\phi_0=0.5$ and $\phi_f=0.2$.

The role of the parameter $\phi_f$ has been explained above (i.e., if $\phi_f=0$ closed-loop system is asymptotically stable, whereas if $\phi_f \in (0, \phi_0)$ we have boundedness). In particular, setting $\phi_f \ne 0$ decrease the number of events. In FIGS. 7 and 8, numerical results are shown for $\phi_f=0$ and $\phi_f=0.2$, respectively, with $\phi_0=0.5$, $\gamma_1=0.7$, $\gamma_2=2.5$, and $\varepsilon=0.7$.

Figure 9:
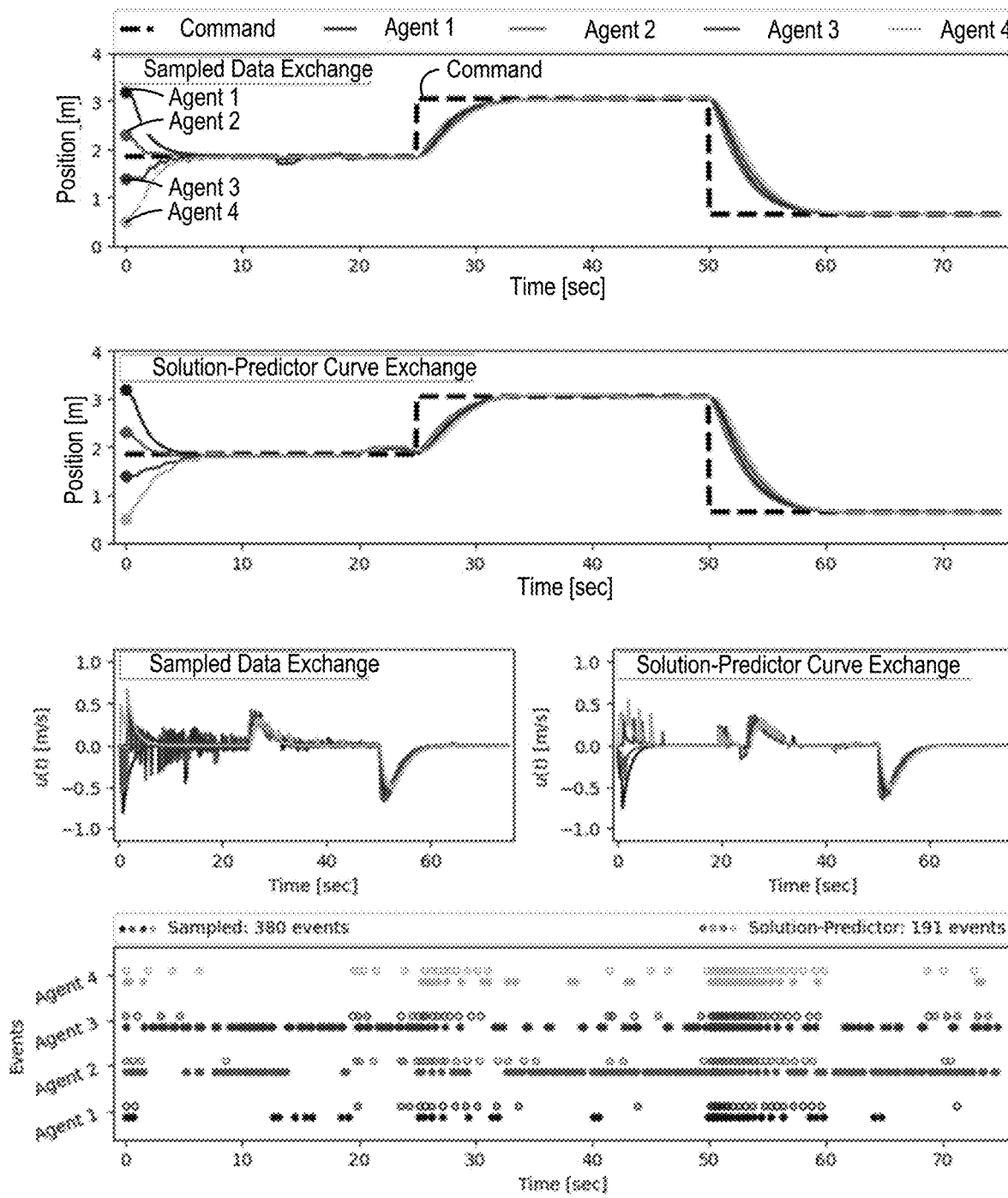
FIG. 9 shows results of an example event-triggering approach with sampled data exchange and solution-predictor curve exchange with $\phi_0=0.5$, $\phi_f=0$, $\gamma_1=0.7$, $\gamma_2=2.5$, and $\varepsilon=0.7$.

The Effect of Leader Agent Location: The location of the leader agent in the graph indirectly affects the number of events. For example, consider FIG. 7, where the first agent is the leader and FIG. 9, where the second agent is the leader. Observe from these figures that the number of events has increased with changing the leader agent from one to two in the event-triggering scenario, where sampled data is exchanged; whereas, it has decreased when exchanging solution-predictor curve. In general, an exact relationship between the leader agent location in a graph and number of events is difficult to establish.

Figure 10:
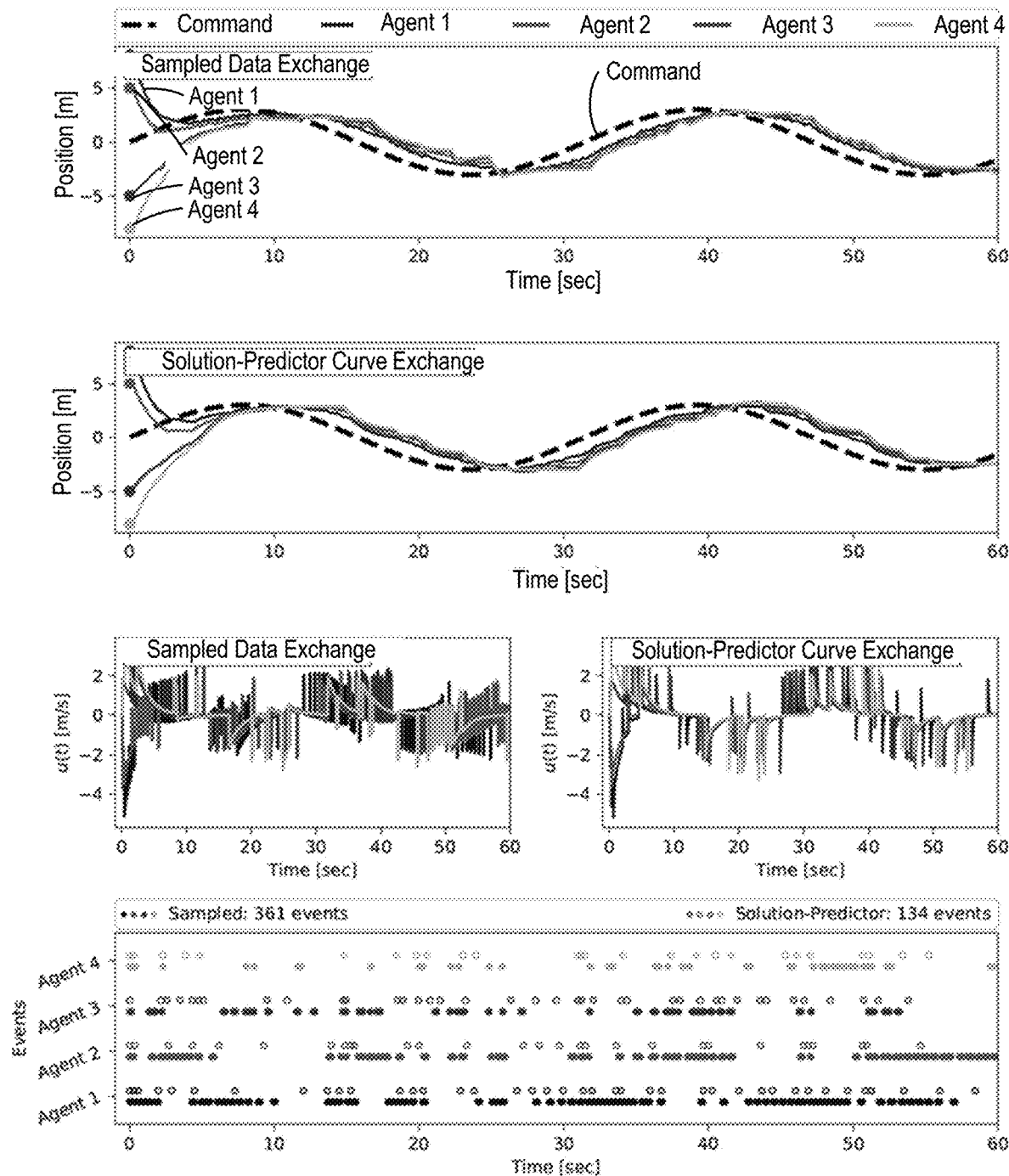
FIG. 10 shows results for time-varying desired command of an example event-triggering approach with sampled data exchange and solution-predictor curve exchange.

Here, the effectiveness of exchanging solution-predictor curve instead of sampled data is shown such that the shared information (i.e., number of events) is significantly reduced without sacrificing performance (see FIG. 4-9). Moreover, the method of solution predictor curve exchange can effectively decrease network utilization (number of events) when a time-varying command is applied; see, for example, FIG. 10, where c(t)=Asin(ωt) with A=2.5 m and ω=0.2 rad. This concludes this section. We present experimental studies predicated on the proposed architecture in the next section.

Experiments: The results of the experiments are presented to elucidate the efficacy of the event-triggering architecture.

Figure 11A:
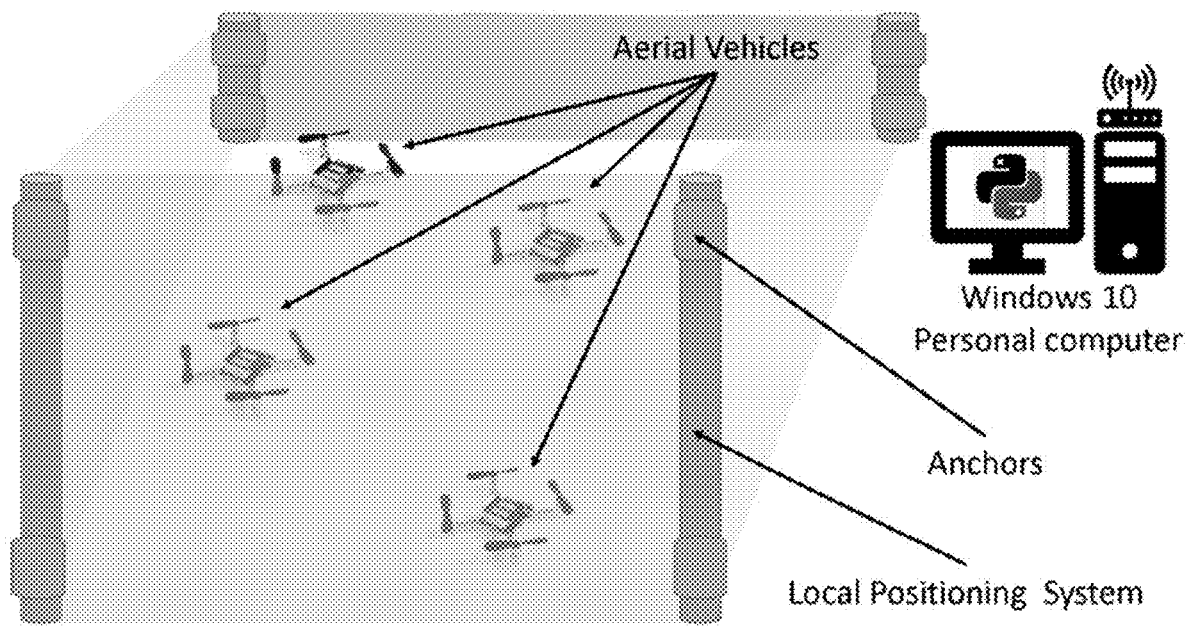
FIG. 11A shows an experimental setup including four crazyflie nano-quadcopters, local positioning system, and a personal computer.
Figure 11B:
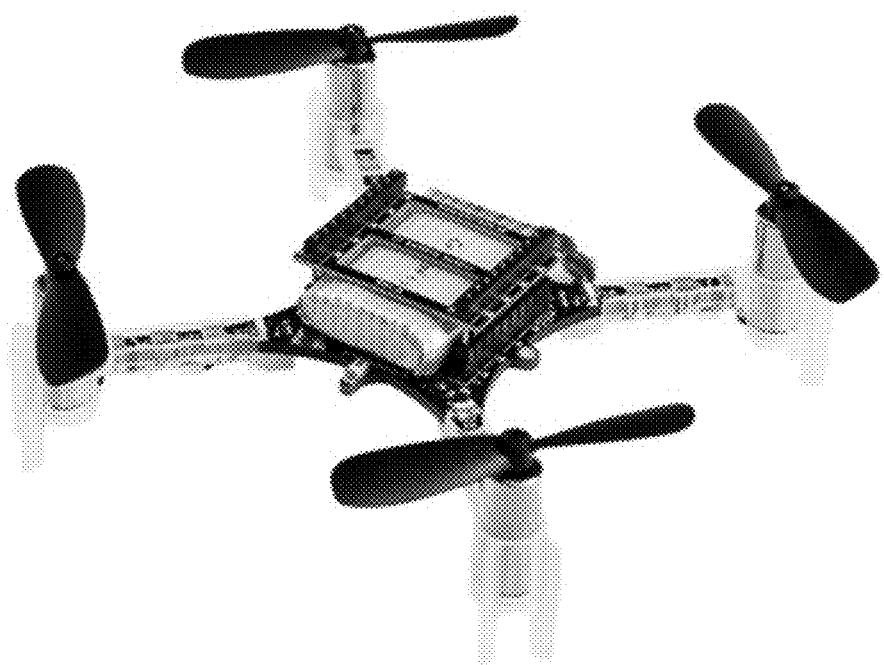
FIG. 11B shows a crazyflie nano-quadcopter.

Experimental Setup: For the experiments, the setup is shown in FIG. 11 that includes three main parts.

A) A personal computer (e.g., with Windows 10) running Python scripts supported by the crazylie opensource libraries equipped with Crazyradio capable of 2.4 GHz radio communication.

B) A crazyflie 2.0 nano-quadcopter (FIG. 11B) that weighs 27 grams equipped with 2.4 GHz ISM band radio for wireless communication, STM32F405 main application MCU (Cortex-M4, 168 MHz, 192 kb SRAM, 1 Mb flash), nRF51822 radio and power management MCU (Cortex-M0, 32 Mhz, 16 kb SRAM, 128 kb flash), 3 axis gyro (MPU-9250), 3 axis accelerometer (MPU-9250), 3 axis magnetometer (MPU-9250), high precision pressure sensor (LPS25H), and 240 mAh LiPo battery (allowing the crazyflie nano-quadcopter a continuous flight of 7 minutes).

C) A local positioning system (LOCO positioning system) having the ability of triangulating 3D position of an objects in space (resembling to a miniature GPS system). This LOCO positioning system is comprised of two subsystems, a set of anchors positioned in the room (resembling satellites in GPS) acting as a reference and one or more tags attached to the crazyflie nano-quadcopter (resembling GPS receivers). Note that the LOCO positioning system determines the position of the object onboard the tag (i.e., onboard the crazyflie nano-quadcopter).

Figure 12:
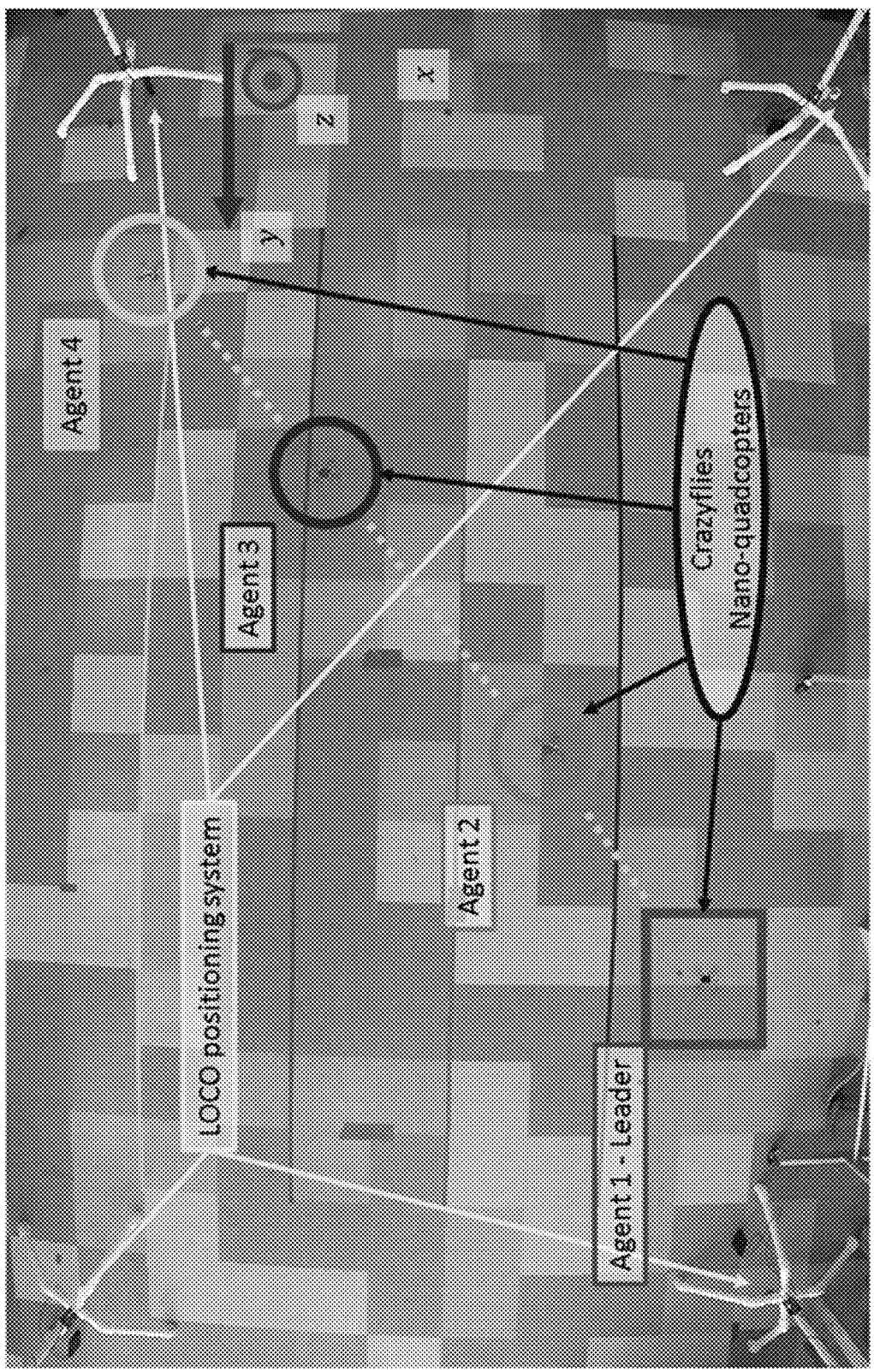
FIG. 12 shows an experimental setup according to some embodiments.

The actual experimental setup is shown in FIG. 12. Four crazyflie nano-quadcopters were used where the crazyflie nano-quadcopters communicate with each other according to the graph topology given in FIG. 3. The x-position of each crazylie is fixed and remains constant throughout the experiment as:

$$x_1=0.5 \text{ m}, x_2=1.2 \text{ m}, x_3=1.9 \text{ m}, x_4=2.6 \text{ m}. \tag{30}$$

In addition, the z-position of each crazylie is also kept constant throughout the experiment at z=0.4 m. Furthermore, the initial y-positions of the crazylies are given by:

$$5y_{10}=3.2 \text{ m}, y_{20}=2.3 \text{ m},$$

$$y_{30}=1.4 \text{ m}, y_{40}=0.5 \text{ m}. \tag{31}$$

The architecture was used for inter-agent information exchange predicated on event-triggering to synchronize the y-position of agents (crazyflies) to follow a command supplied to the leader agent given by (29). The rest of the parameters were set as ε=0.7, $\gamma_1$ 0.7, $\gamma_2$=2.5, and $\phi_0$=0.5. The experiments were run for $\phi_f \in \{0, 0.05, 0.2\}$ where $\phi_f$=0.05 corresponds to $\phi(T/4)$ and $\phi_f$=0.2 corresponds to $\phi(T/2)$ with $T \in \mathbb{R}_+$ being the total time of the experiments. Note that $\phi_f \neq 0$ leads to bounded results. In addition, the sampling rate was set as 10 Hertz, and four separate Python scripts were run in parallel, one for each agent (crazyflie) respectively.

Experimental Results: A total of twelve experiments were run. The first agent was set as the leader and run the experiments for $\phi_f$=0 by first utilizing sampled data exchange over the network to be shared between neighboring agents, and then the exchange of solution-predictor curves was used between neighboring agents. Then the experiments were repeated for $\phi_f$=0.05 and $\phi_f$=0.2. Next, the six aforementioned experiments were repeated by setting the second agent as the leader.

Figure 13:
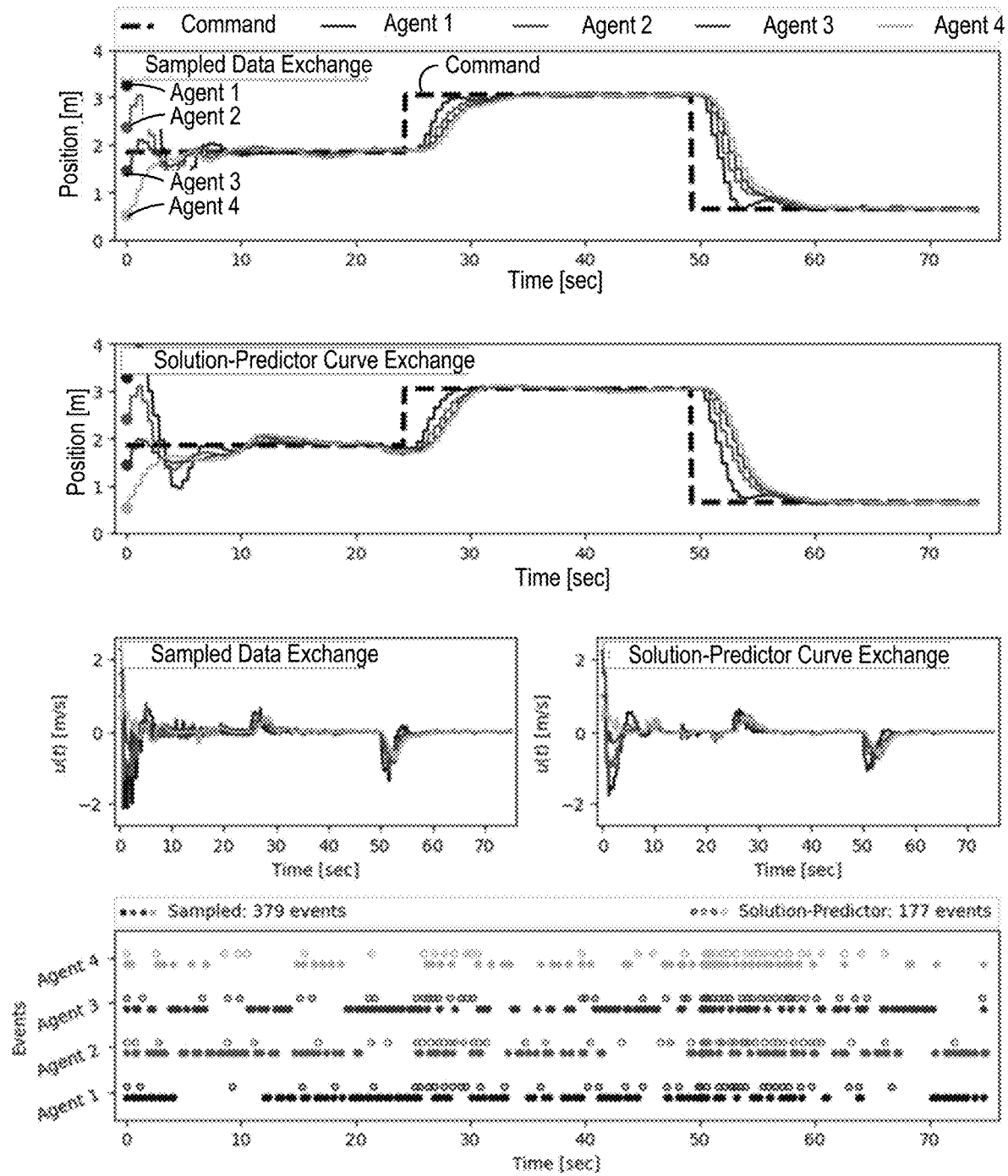
FIG. 13 shows experimental results of an example event-triggering approach with sampled data exchange and solution-predictor curve exchange with $\gamma_1=0.7$, $\gamma_2=2.5$, $\varepsilon=0.7$, $\phi_0=0.5$, and $\phi_f=0$.
Figure 14:
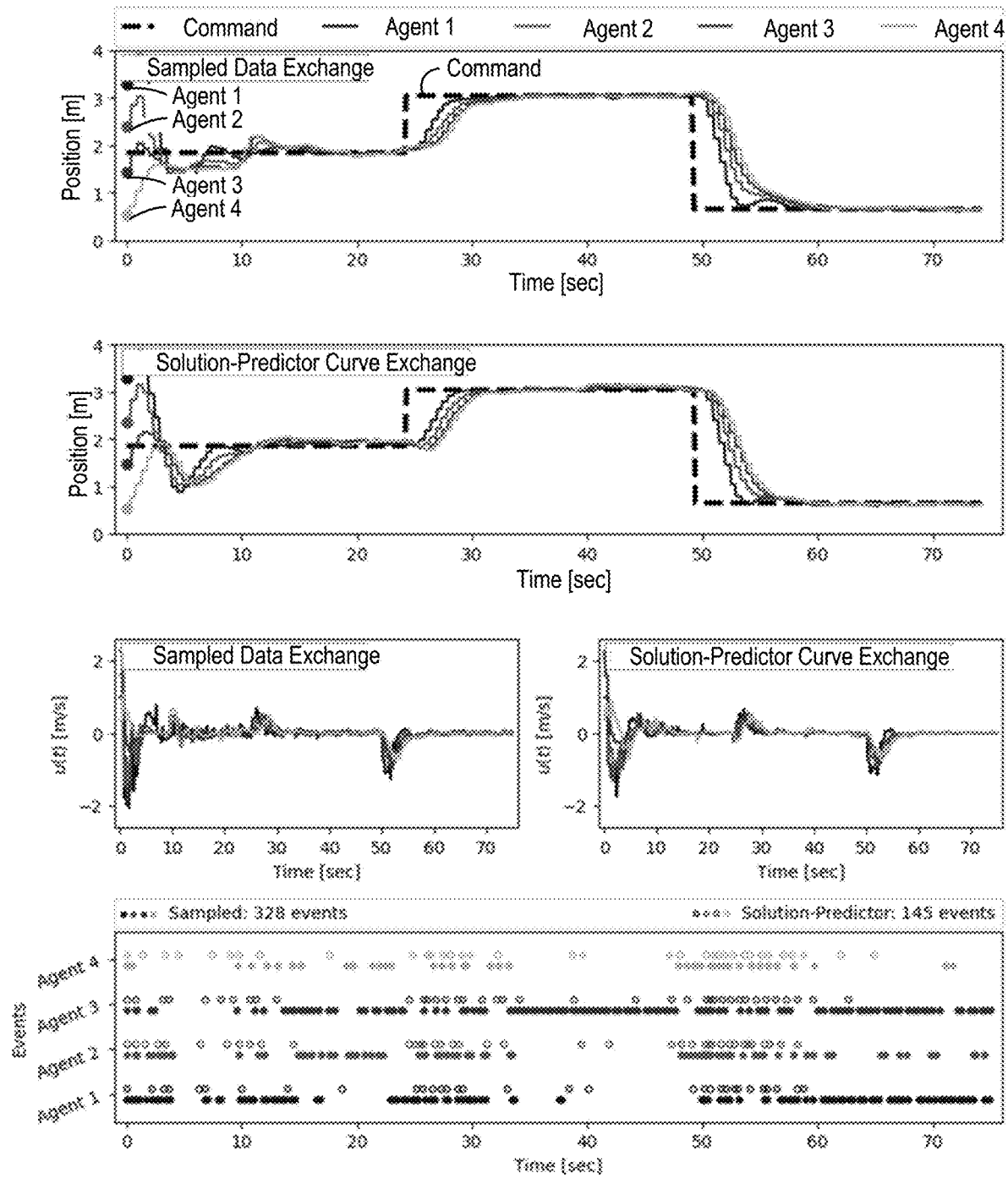
FIG. 14 shows experimental results of an example event-triggering approach with sampled data exchange and solution-predictor curve exchange with $\gamma_1=0.7$, $\gamma_2=2.5$, $\varepsilon=0.7$, $\phi_0=0.5$, and $\phi_f=0.05$.
Figure 15:
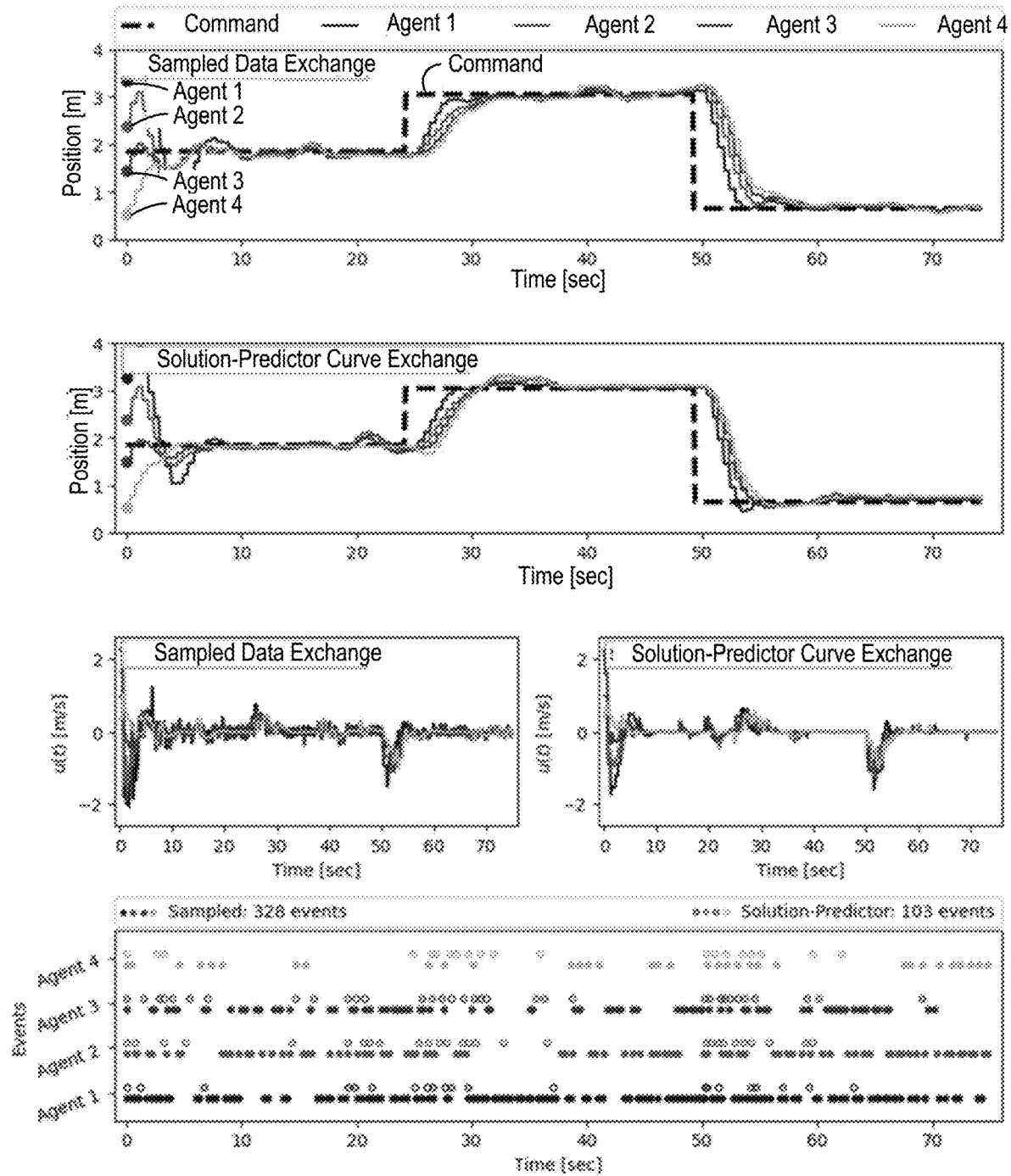
FIG. 15 shows experimental results of an example event-triggering approach with sampled data exchange and solution-predictor curve exchange with $\gamma_1=0.7$, $\gamma_2=2.5$, $\varepsilon=0.7$, $\phi_0=0.5$, and $\phi_f=0.2$.
Figure 16:
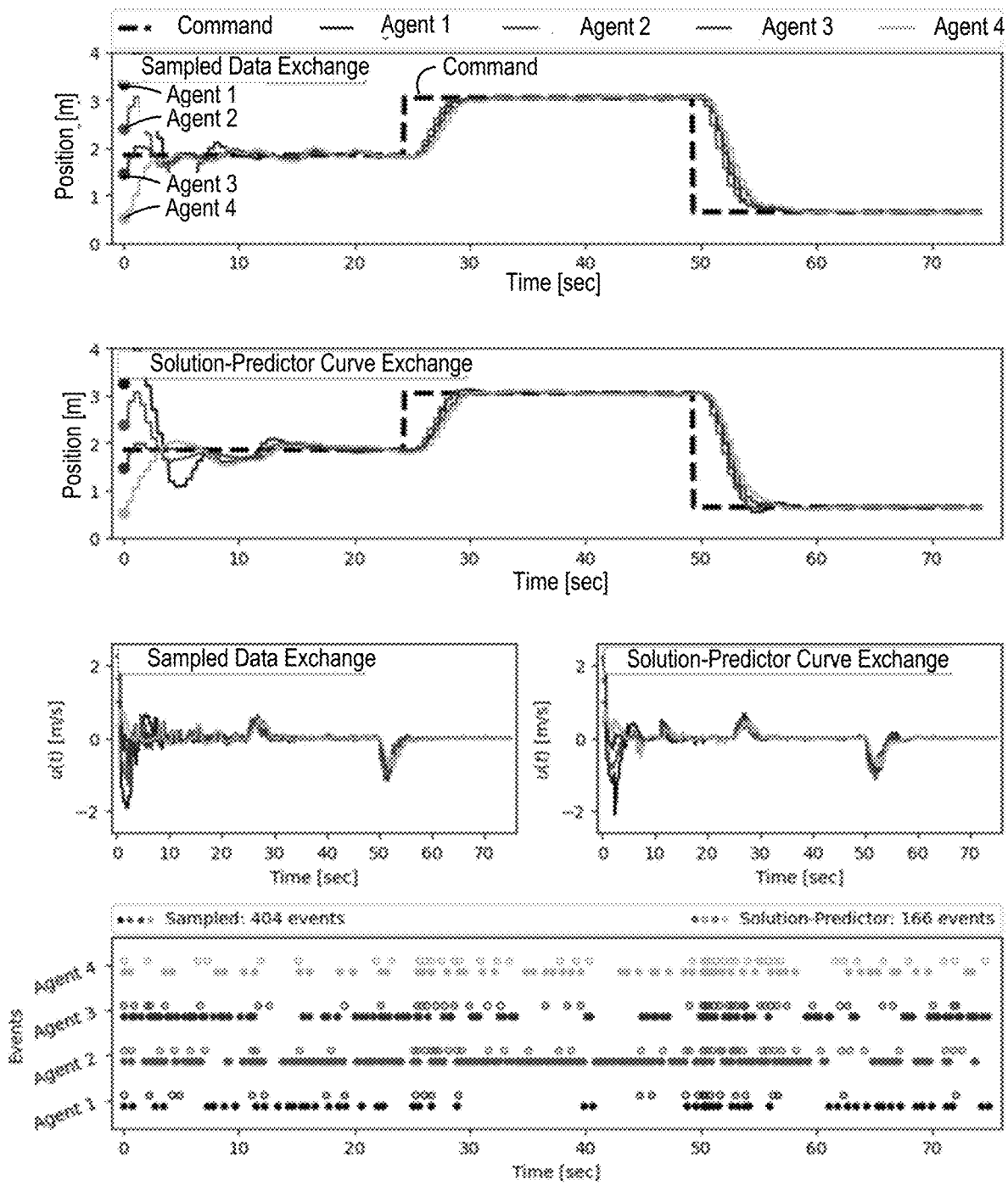
FIG. 16 shows experimental results of an example event-triggering approach with sampled data exchange and solution-predictor curve exchange with $\gamma_1=0.7$, $\gamma_2=2.5$, $\varepsilon=0.7$, $\phi_0=0.5$, and $\phi_f=0$.
Figure 17:
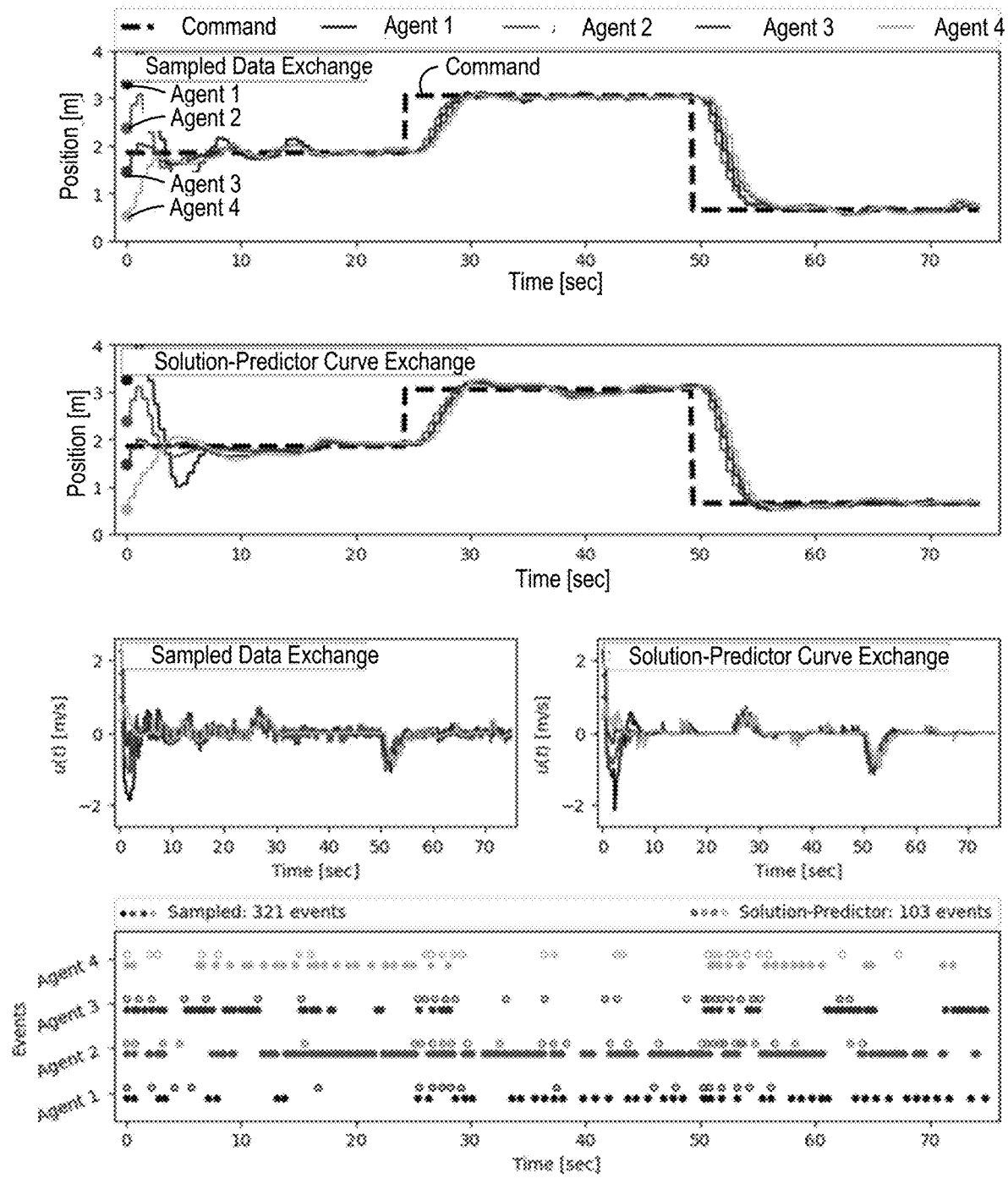
FIG. 17 shows experimental results of an example event-triggering approach with sampled data exchange and solution-predictor curve exchange with $\gamma_1=0.7$, $\gamma_2=2.5$, $\varepsilon=0.7$, $\phi_0=0.5$, and $\phi_f=0.05$.
Figure 18:
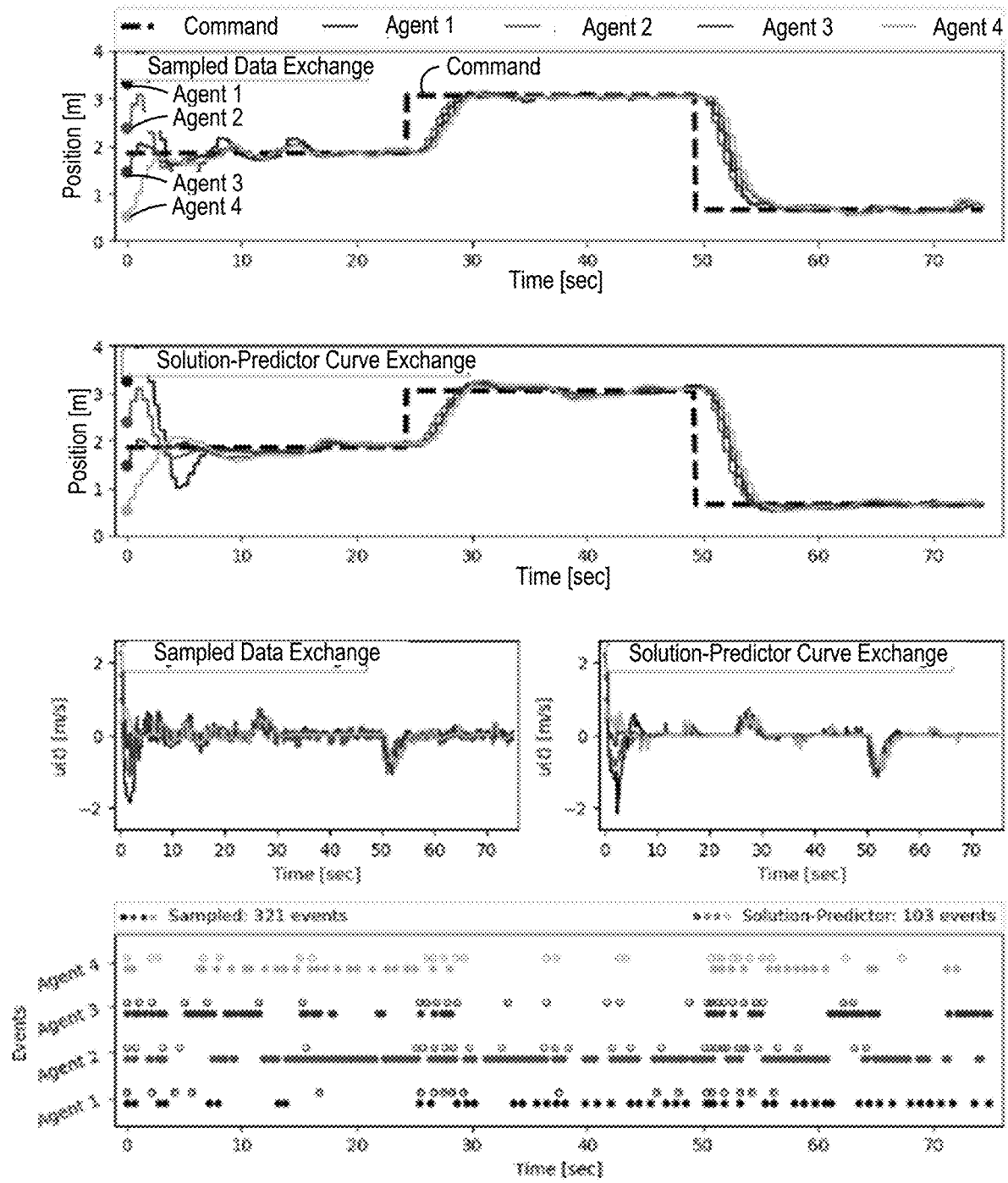
FIG. 18 shows experimental results of an example event-triggering approach with sampled data exchange and solution-predictor curve exchange with $\gamma_1=0.7$, $\gamma_2=2.5$, $\varepsilon=0.7$, $\phi_0=0.5$, and $\phi_f=0.2$.

The experimental results, where the first agent is selected to be the leader, are summarized in FIG. 13-15. In addition, experimental results, where the second agent is selected to be the leader, are summarized in FIG. 16-18.

Several observations can be made from the experimental results. First, utilizing the event-triggering approach significantly reduces network utilization (number of events). When solution-predictor curves were exchanged between neighboring agents when an event occurs (instead of just sharing a sampled data), an even more drastic decrease occurs in network utilization (number of events) irrelevant of the location of the leader agent in the graph. Note that the experimental results support the numerical examples. For example, FIGS. 7 and 8 that show numerical results where the first agent is the leader with $\phi_f$=0 and $\phi_f$=0.2, respectively can be compared with FIGS. 13 and 15 that show the corresponding experimental results. In addition, FIG. 9 that shows numerical results where the second agent is the leader with $\phi_f$=0 can be compared to FIG. 16 that shows the corresponding experimental results.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method for information exchange of a first vehicle in a networked multiagent system, comprising:
   receiving a last neighbor dataset broadcasted by a neighbor vehicle;
   determining a current dataset based on the last neighbor dataset and a last vehicle dataset of the first vehicle;
   identifying a violation of an event-triggering condition by comparing a difference between the last vehicle dataset and the current dataset with a dynamic threshold, the dynamic threshold being defined by an exponentially decaying term and an error between a vehicle state of the first vehicle and a reference state;
   determining a transmission dataset being associated with the current dataset; and
   in response to the violation, broadcasting the transmission dataset to the neighbor vehicle.

2. The method of claim 1, wherein the last vehicle dataset comprises a dataset previously transmitted to the first vehicle in response to the violation.

3. The method of claim 1, wherein the first vehicle is a leader vehicle, and
   wherein the current dataset is determined further based on a command.

4. The method of claim 3, wherein the current dataset is defined as:

$$\mu_i(t) = -\gamma_2[\Sigma_{i \sim j}(\hat{\mu}_i(t) - \hat{\mu}_j(t)) + \hat{\mu}_i(t) - c(t)],$$

where $\mu_i(t)$ is the current dataset, $\gamma_2$ is a design parameter, $\hat{\mu}_i(t)$ is the last vehicle dataset, $\hat{\mu}_j(t)$ is the last neighbor dataset, and c(t) is the command.

5. The method of claim 1, wherein the first vehicle is a follower vehicle, and
   wherein the current dataset is defined as:

$$\mu_i(t) = -\gamma_2[\Sigma_{i \sim j}(\hat{\mu}_i(t) - \hat{\mu}_j(t))],$$

where $\mu_i(t)$ is the current dataset, $\gamma_2$ is a design parameter, $\hat{\mu}_i(t)$ is the last vehicle dataset, and $\hat{\mu}_j(t)$ is the last neighbor dataset.

6. The method of claim 1, wherein the event-triggering condition is defined as:

$$\|\hat{\mu}_i(t)-\mu_i(t)\|_2 \leq \varepsilon\|e_i(t)\|_2+\phi(t), \text{ and}$$

$$e_i(t) \triangleq x_i(t)-x_{mi}(t),$$

where $\mu_i(t)$ is the current dataset, $\hat{\mu}_i(t)$ is the last vehicle dataset, $\varepsilon$ is a design parameter, $\varepsilon\|e_i(t)\|_2+\phi(t)$ is the dynamic threshold, $e_i(t)$ is the error, $x_i(t)$ is the vehicle state of the first vehicle, $x_{mi}(t)$ is the reference state, and $\phi(t)$ is the exponentially decaying term.

7. The method of claim 1, wherein the transmission dataset comprises sampled data of the current dataset.

8. The method of claim 1, wherein the transmission dataset comprises a parameter for a solution-predictor curve to estimate the current dataset.

9. The method of claim 8, wherein the parameter comprises an initial condition and a solution-predictor parameter defined by the last neighbor dataset.

10. The method of claim 9, wherein in response to the first vehicle being a leader vehicle, the solution-predictor parameter is defined as:

$$\frac{\sum_{i\sim j}\hat{\mu}_j(t_{dj}) + c(t_{di})}{1+d_i},$$

and
wherein in response to the first vehicle being a follower vehicle, the solution-predictor value is defined as:

$$\frac{\sum_{i\sim j}\hat{\mu}_j(t_{dj})}{d_i},$$

and
wherein $c(t_{di})$ is a command, $\hat{\mu}_j(t_{dj})$ is the last neighbor dataset of the neighbor vehicle, and $d_i$ is a degree of the first vehicle.

11. An apparatus for providing information exchange among vehicles, the apparatus comprising:
a processor; and
a memory having stored thereon a set of instructions which, when executed by the processor, cause the processor to:
receive a last neighbor dataset broadcasted by a neighbor vehicle;
determine a current dataset based on the last neighbor dataset and a last vehicle dataset of the first vehicle;
identify a violation of an event-triggering condition by comparing a difference between the last vehicle dataset and the current dataset with a dynamic threshold, the dynamic threshold being defined by an exponentially decaying term and an error between a vehicle state of the first vehicle and a reference state;
determine a transmission dataset being associated with the current dataset; and
in response to the violation, broadcast the transmission dataset to the neighbor vehicle.

12. The agent of claim 11, wherein the last vehicle dataset comprises a dataset previously transmitted to the first vehicle in response to the violation.

13. The agent of claim 11, wherein the first vehicle is a leader vehicle, and
wherein the current dataset is determined further based on a command.

14. The agent of claim 13, wherein the current dataset is defined as:

$$\mu_i(t)=-\gamma_2[\Sigma_{i\sim j}(\hat{\mu}_i(t)-\hat{\mu}_j(t))+\hat{\mu}_i(t)-c(t)],$$

where $\mu_i(t)$ is the current dataset, $\gamma_2$ is a design parameter, $\hat{\mu}_i(t)$ is the last vehicle dataset, $\hat{\mu}_j(t)$ is the last neighbor dataset, and $c(t)$ is the command.

15. The agent of claim 11, wherein the first vehicle is a follower vehicle, and
wherein the current dataset is defined as:

$$\mu_i(t)=-\gamma_2[\Sigma_{i\sim j}(\hat{\mu}_i(t)-\hat{\mu}_j(t))],$$

where $\mu_i(t)$ is the current dataset, $\gamma_2$ is a design parameter, $\hat{\mu}_i(t)$ is the last vehicle dataset, and $\hat{\mu}_j(t)$ is the last neighbor dataset.

16. The agent of claim 11, wherein the event-triggering condition is defined as:

$$\|\hat{\mu}_i(t)-\mu_i(t)\|_2 \leq \varepsilon\|e_i(t)\|_2+\phi(t), \text{ and}$$

$$e_i(t) \triangleq x_i(t)-x_{mi}(t),$$

where $\mu_i(t)$ is the current dataset, $\hat{\mu}_i(t)$ is the last vehicle dataset, $\varepsilon$ is a design parameter, $\varepsilon\|e_i(t)\|_2+\phi(t)$ is the dynamic threshold, $e_i(t)$ is the error, $x_i(t)$ is the vehicle state of the first vehicle, $x_{mi}(t)$ is the reference state, and $\phi(t)$ is the exponentially decaying term.

17. The agent of claim 11, wherein the transmission dataset comprises sampled data of the current dataset.

18. The agent of claim 11, wherein the transmission dataset comprises a parameter for a solution-predictor curve to estimate the current dataset.

19. The agent of claim 18, wherein the parameter comprises an initial condition and a solution-predictor parameter defined by the last neighbor dataset.

20. The agent of claim 19, wherein in response to the first vehicle being a leader vehicle, the solution-predictor parameter is defined as:

$$\frac{\sum_{i\sim j}\hat{\mu}_j(t_{dj}) + c(t_{di})}{1+d_i},$$

and
wherein in response to the first vehicle being a follower vehicle, the solution-predictor value is defined as:

$$\frac{\sum_{i\sim j}\hat{\mu}_j(t_{dj})}{d_i},$$

and
wherein $c(t_{di})$ is a command, $\hat{\mu}_j(t_{dj})$ is the last neighbor dataset of the neighbor vehicle, and $d_i$ is a degree of the first vehicle.

* * * * *